(12) United States Patent
Ryu et al.

(10) Patent No.: US 8,826,482 B2
(45) Date of Patent: Sep. 9, 2014

(54) WINDOW CLEANING APPARATUS AND METHOD FOR CONTROLLING MOVEMENT THEREOF

(75) Inventors: Man Hyun Ryu, Gyeongbuk (KR); Kwang Mok Jung, Gyeongbuk (KR); Young Ho Choi, Gyeongbuk (KR)

(73) Assignees: Intellectual Discovery Co., Ltd., Seoul (KR); Korea Institute of Robot & Convergence, Pohang (KR)

( * ) Notice: Subject to any disclaimer, the term of this patent is extended or adjusted under 35 U.S.C. 154(b) by 0 days.

(21) Appl. No.: 13/386,671

(22) PCT Filed: Apr. 29, 2011

(86) PCT No.: PCT/KR2011/003201
§ 371 (c)(1),
(2), (4) Date: Jan. 24, 2012

(87) PCT Pub. No.: WO2012/148022
PCT Pub. Date: Nov. 1, 2012

(65) Prior Publication Data
US 2014/0034084 A1 Feb. 6, 2014

(51) Int. Cl.
*A47L 1/03* (2006.01)
*A47L 1/02* (2006.01)
*G05D 1/02* (2006.01)

(52) U.S. Cl.
CPC ............. *A47L 1/02* (2013.01); *A47L 2201/06* (2013.01); *G05D 1/0227* (2013.01); *G05D 2201/0203* (2013.01); *A47L 1/03* (2013.01); *G05D 1/027* (2013.01)
USPC ............................... 15/103; 15/49.1; 15/220.2

(58) Field of Classification Search
USPC ........................................ 15/49.1, 103, 220.2
See application file for complete search history.

(56) References Cited

U.S. PATENT DOCUMENTS 8,099,818 B2 * 1/2012 Miyake et al. .................. 15/103
8,127,390 B2 * 3/2012 Kim ................................ 15/50.1
2005/0166353 A1 8/2005 Uehigashi

FOREIGN PATENT DOCUMENTS

| DE | 19928869 A1 | 1/2001 |
| GB | 2394795 A | 5/2004 |
| KR | 10-1997-0063604 | 9/1997 |
| KR | 20-0312929 | 5/2003 |
| KR | 20-0438170 | 1/2008 |
| WO | 2006/078921 A1 | 7/2006 |

OTHER PUBLICATIONS

European Patent Office, Office Action corresponding to EP Patent Application No. 11810983.4, mailed Nov. 25, 2013.

* cited by examiner

*Primary Examiner* — Randall Chin
(74) *Attorney, Agent, or Firm* — Sughrue Mion, PLLC

(57) ABSTRACT

Provided are a window cleaning apparatus including first and second cleaning units which are respectively attached on both surfaces of a window using a magnetic force to move together with each other, and a method for controlling a movement of the window cleaning apparatus. The window cleaning apparatus includes a direction detecting sensor, a control part, a collision sensing part, and an offset setting part. The direction detecting sensor is provided to at least one of the first and second cleaning units to detect a moving direction of the window cleaning apparatus. The control part controls a movement of the window cleaning apparatus, based on the moving direction detected by the direction detecting sensor. The collision sensing part senses a shock to the window cleaning apparatus. The offset setting part sets a direction offset of the direction detecting sensor when the window cleaning apparatus collides with a frame of the window.

14 Claims, 26 Drawing Sheets fig.10
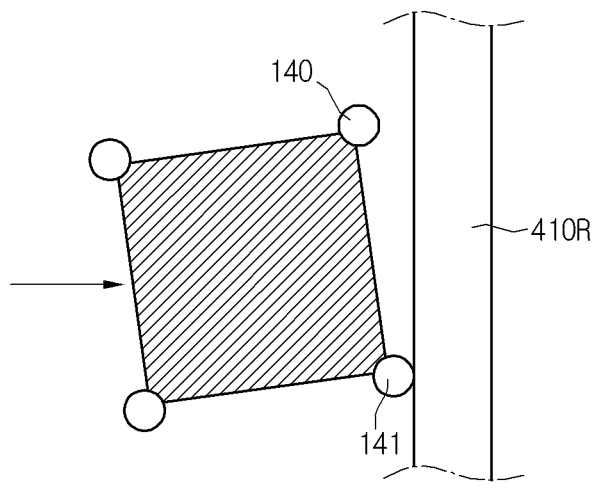
(a)
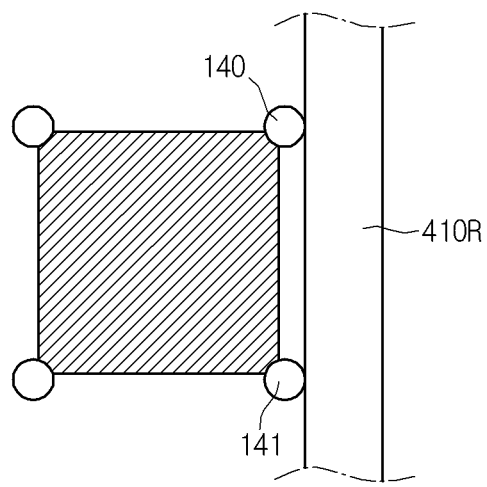
(b)

fig.13
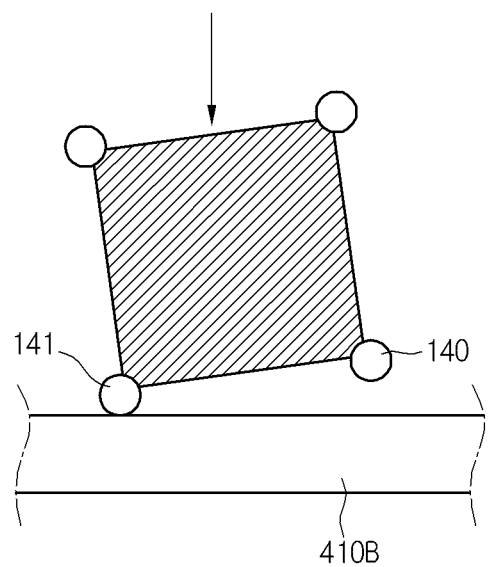
(a)
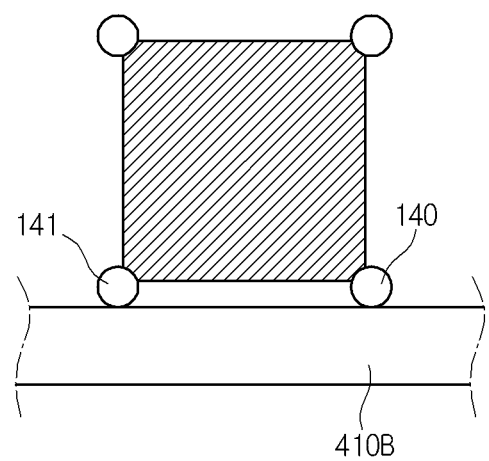
(b)

WINDOW CLEANING APPARATUS AND METHOD FOR CONTROLLING MOVEMENT THEREOF

CROSS-REFERENCE TO RELATED APPLICATIONS

The present application claims priority under 35 U.S.C. 119 and 35 U.S.C. 365 to PCT Patent Application No. PCT/KR2011/003201 (filed on 29 Apr. 2011 which is hereby incorporated by reference in its entirety.

BACKGROUND

The present disclosure relates to an apparatus for cleaning a window.

Windows installed on a wall of a building are easily polluted by external dust and pollutants, which may degrade their appearance and lighting performance. Thus, such windows are frequently cleaned.

However, the outer surface of a window is more difficult to clean than the inner surface thereof. Particularly, as the height of buildings increases, cleaning of the outer surface of a window may involve great risks.

SUMMARY

Embodiments provide a window cleaning apparatus that efficiently operates with improved safety, and a method for controlling a movement thereof.

In one embodiment, a window cleaning apparatus including first and second cleaning units which are respectively attached on both surfaces of a window using a magnetic force to move together with each other further includes: a direction detecting sensor provided to at least one of the first and second cleaning units to detect a moving direction of the window cleaning apparatus; a control part controlling a movement of the window cleaning apparatus, based on the moving direction detected by the direction detecting sensor; a collision sensing part sensing a shock to the window cleaning apparatus; and an offset setting part setting a direction offset of the direction detecting sensor when the window cleaning apparatus collides with a frame of the window.

In another embodiment, a method for controlling a movement of a window cleaning apparatus includes: using a direction detecting sensor to detect a moving direction of the window cleaning apparatus; and moving the window cleaning apparatus, based on the detected moving direction, wherein a direction offset of the direction detecting sensor is reset when the window cleaning apparatus collides with a frame of the window.

The control method may be realized through a computer readable recording medium which records a program for executing the method in a computer.

The details of one or more embodiments are set forth in the accompanying drawings and the description below. Other features will be apparent from the description and drawings, and from the claims.

BRIEF DESCRIPTION OF THE DRAWINGS

FIGS. 8 to 10B are schematic views illustrating a method of setting a horizontal offset of a direction detecting sensor according to an embodiment.

FIGS. 11 to 13B are schematic views illustrating a method of setting a vertical offset of a direction detecting sensor according to an embodiment.

DETAILED DESCRIPTION OF THE EMBODIMENTS

Figure 1:
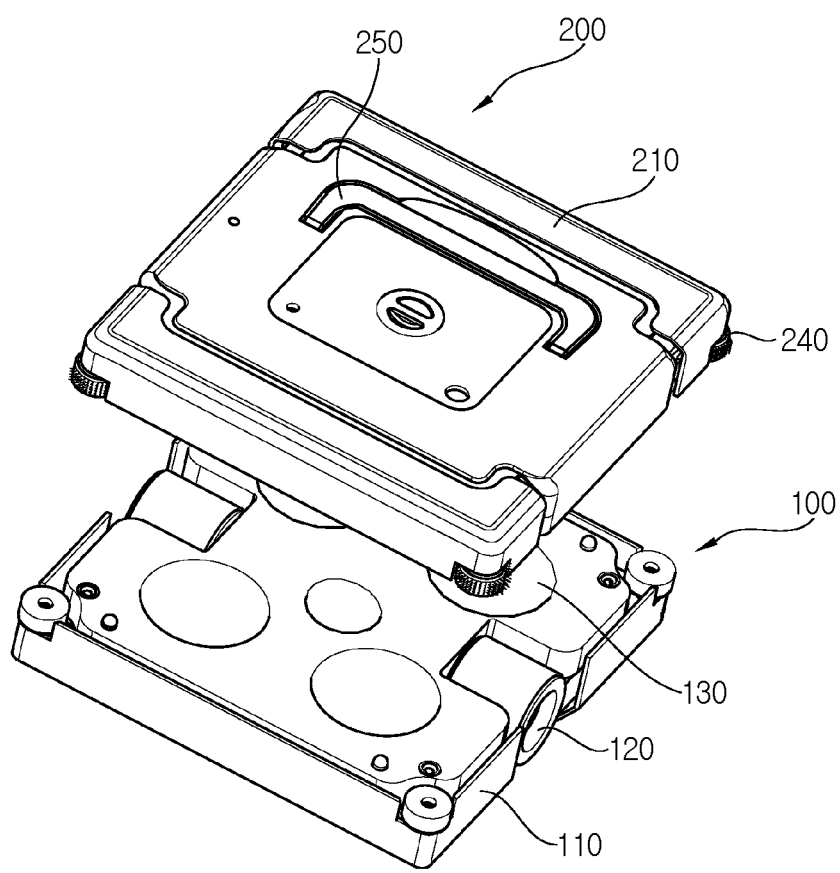
FIG. 1 is a perspective view illustrating a window cleaning apparatus according to an embodiment.

Reference will now be made in detail to the embodiments of the present disclosure, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the dimensions of components are exaggerated for clarity.

FIG. 1 is a perspective view illustrating a window cleaning apparatus according to an embodiment. Referring to FIG. 1, a window cleaning apparatus according to the current embodiment may include a first cleaning unit 100 and a second cleaning unit 200, which are disposed on both surfaces of a window, respectively.

The first cleaning unit 100 may be disposed on the inner surface of the window, and the second cleaning unit 200 may be disposed on the outer surface of the window. On the contrary, the first cleaning unit 100 may be disposed on the outer surface of the window, and the second cleaning unit 200 may be disposed on the inner surface of the window.

Each of the first and second cleaning units 100 and 200 may accommodate a magnetic module having magnetic force, so that the first and second cleaning units 100 and 200 can be attached to both opposite surfaces of a window.

When the first cleaning unit 100 is moved on the inner surface of a window by an external or internal power source, the second cleaning unit 200 may be moved together with the first cleaning unit 100 by magnetic force between the magnetic modules of the first and second cleaning units 100 and 200.

The second cleaning unit 200 may include a handle 250 as an attachment/detachment member 250 for easily attaching and detaching the second cleaning unit 200 to and from a window. Also, the first cleaning unit 100 may include an attachment/detachment member (not shown) corresponding to the attachment/detachment member 250 to easily attach and detach the first cleaning unit 100.

Thus, a user can attach the window cleaning apparatus to a window by using the attachment/detachment members of the first and second cleaning units 100 and 200, that is, by using the handles, and detach the first and second cleaning units 100 and 200 from the window by using the handles after cleaning.

The window cleaning apparatus may further include a remote controller (not shown) for a user to control the first and second cleaning units 100 and 200.

As described above, the second cleaning unit 200 is passively moved by the magnetic force according to a movement of the first cleaning unit 100. A user can control a movement of the first cleaning unit 100 by using the remote controller, thereby controlling driving of the window cleaning apparatus including the first and second cleaning units 100 and 200.

Although a wireless type remote controller is exemplified in the current embodiment, a wire type remote controller may be used, or the window cleaning apparatus can be manually manipulated by a user.

The window cleaning apparatus, more particularly, the first cleaning unit 100 disposed on the inner surface of a window may be moved along a preset moving path, or may include a sensor (not shown) for sensing a target such as dust to move along a moving path for improving cleaning efficiency.

Hereinafter, the first and second cleaning units 100 and 200 will now be described in more detail with reference to FIGS. 2 and 3.

Figure 2:
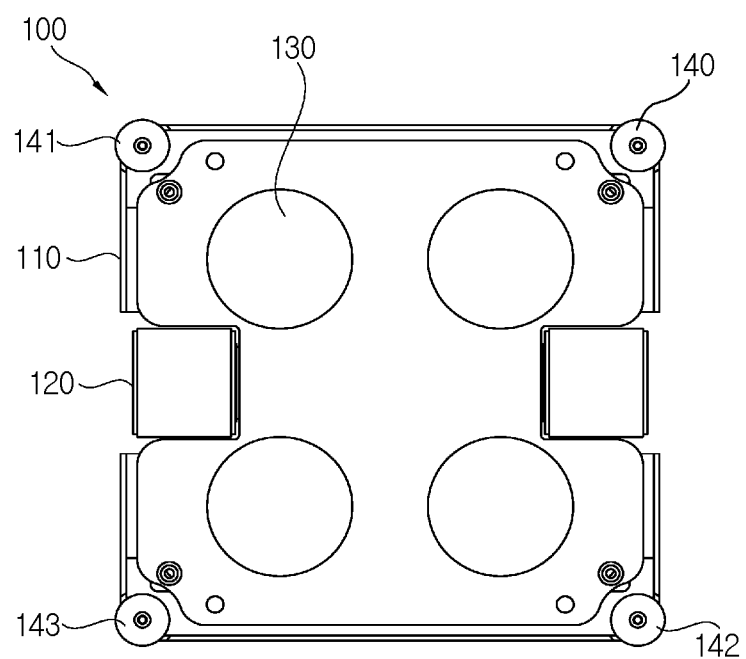
FIG. 2 is a plan view illustrating a first cleaning unit disposed on the inner surface of a window according to an embodiment.

FIG. 2 is a plan view illustrating the top surface of the first cleaning unit 100 contacting a window.

Referring to FIG. 2, the first cleaning unit 100 may include a first frame 110, a plurality of first wheel members 120, and a plurality of first magnetic modules 130.

The first frame 110 constitutes a body of the first cleaning unit 100, so that the first wheel members 120 and the first magnetic modules 130 can be coupled and fixed to the first frame 110.

Buffer members 140 to 143 may be disposed at the edge of the first frame 110 to minimize a shock when the window cleaning apparatus collides with a protrusion structure such as the frame of a window. Sensors (not shown) are connected to the buffer members 140 to 143, respectively. When the sensors sense a shock, the first cleaning unit 100 may change a moving path thereof.

For example, as illustrated in FIG. 2, the buffer members 140 to 143 may be disposed at the four corners of the first cleaning unit 100, respectively, and the sensors connected to the buffer members 140 to 143 sense a shock, to thereby recognize that the first cleaning unit 100 collides with the frame of a window.

In detail, while the window cleaning apparatus moves, when a shock is sensed at the buffer members 140 and 141 disposed at a side of the first cleaning unit 100, it is recognized that the side of the first cleaning unit 100 where the buffer members 140 and 141 are disposed collides with the frame of a window.

The first frame 110 of the first cleaning unit 100 has a rectangular cross-section, but is not limited thereto, and thus, may have a circular or polygonal cross-section.

The first cleaning unit 100 may include the first magnetic modules 130 that generate magnetic force to attach the first and second cleaning units 100 and 200 to both surfaces of a window.

For example, the first magnetic modules 130 may include a permanent magnet such as a neodium magnet to generate magnetic force together with second magnetic modules 233 of the second cleaning unit 200.

In more detail, the first magnetic modules 130 of the first cleaning unit 100 may include a magnet having a pole opposite to that of a magnet of the second magnetic modules 233 provided to the second cleaning unit 200, so that the first and second cleaning units 100 and 200 disposed on both surfaces of a window can attract each other with magnetic force. Accordingly, the first and second cleaning units 100 and 200 can be attached to the window, and be moved together.

According to another embodiment, the first and second magnetic modules 130 and 233 may include electromagnets. According to further another embodiment, the first and second magnetic modules 130 and 233 may include permanent magnets and electromagnets.

The window cleaning apparatus is not limited to the first and second magnetic modules 130 and 233, and thus, may include any configuration, provided that the first and second cleaning units 100 and 200 can attract each other with magnetic force, and move on a window therebetween.

For example, one of the first and second cleaning units 100 and 200 may include a magnetic body such as a permanent magnet or electromagnet, and the other may include a metal body that can be attracted by magnetic force of the magnetic body.

Referring to FIG. 2, the first magnetic modules 130 may include four disk bodies that may be disposed on the top surface of the first cleaning unit 100 contacting a window.

The first magnetic modules 130 may be exposed to the window, or be adjacent to the top surface of the first cleaning unit 100 through a cover member.

The first wheel members 120 may be provided at least in two on the left and right sides of the first cleaning unit 100 such that a portion of the first wheel members 120 is exposed to the upper side of the first frame 110. For example, as illustrated in FIG. 2, two wheel members may be disposed at the left and right sides of the first cleaning unit 100, respectively. Alternatively, four wheel members may be disposed at the four corners of the first cleaning unit 100, respectively.

For example, the first wheel members 120 may be rotated by a driving part (not shown) such as a motor disposed in the first frame 110. The first cleaning unit 100 attached to a window may be moved to a certain direction according to a rotation of the first wheel members 120.

The first cleaning unit 100 may move not only along a straight line, but also along a curved line, that is, change a moving direction thereof. To this end, for example, a rotation shaft of the first wheel members 120 may be steered, or the first wheel members 120 at the left and right sides may be rotated at different speeds.

The outer surface of the first wheel members 120 may be provided with a material such as fabric or rubber to generate certain frictional force against a window, thereby preventing idling of the first wheel members 120 and facilitating a movement of the first cleaning unit 100 on the inner surface of the window. Furthermore, the outer surface of the first wheel members 120 may be provided with a material to prevent a scratch of a window due to the rotation of the first wheel members 120.

When the first cleaning unit 100 is attached to a surface of a window by magnetic force of the first magnetic modules 130, reaction force perpendicular to the window may be applied to the first wheel members 120. In this state, when the driving part such as a motor rotates the first wheel members 120, the first cleaning unit 100 can be moved on the surface of the window by frictional force.

When the first cleaning unit 100 is moved by a rotation of the first wheel members 120, the second cleaning unit 200 attached to the other surface of the window, that is, the outer surface thereof is moved together with the first cleaning unit 100 by the magnetic force, so that a cleaning operation can be performed.

Figure 3:
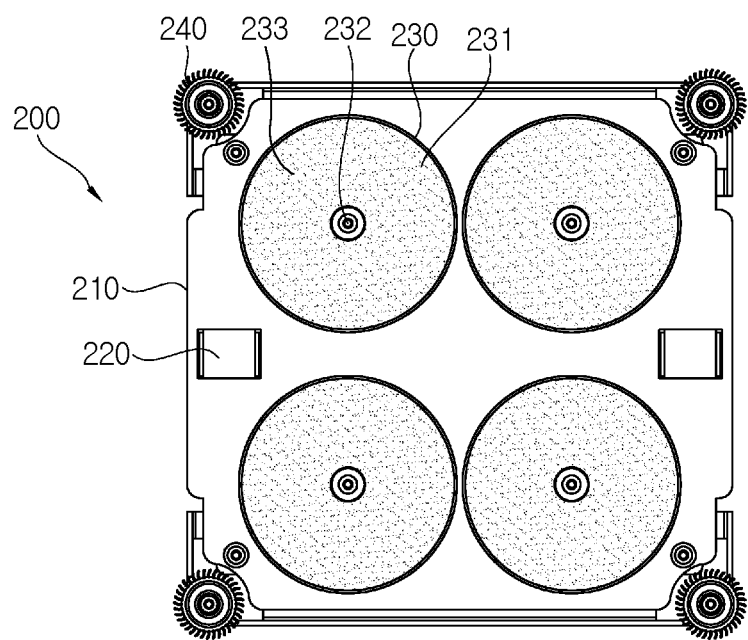
FIG. 3 is a plan view illustrating a second cleaning unit disposed on the outer surface of a window according to an embodiment.

FIG. 3 is a plan view illustrating the second cleaning unit 200 according to an embodiment. FIG. 2 illustrates the bottom surface of the second cleaning unit 200 contacting a window.

Referring to FIG. 3, the second cleaning unit 200 may include a second frame 210, a plurality of second wheel members 220, and a plurality of cleaning modules 230.

The second frame 210 may constitute a body of the second cleaning unit 200. As described above, the second frame 210 may have a shape corresponding to that of the first frame 110. For example, the second frame 210 may have a plate structure having a rectangular shape in section.

The second wheel members 220 may be disposed on the bottom surface of the second frame 210 to move the second cleaning unit 200 with magnetic force according to a movement of the first cleaning unit 100.

The second wheel members 220 may be connected to the second frame 210 through a shaft to smoothly rotate according to a movement of the second cleaning member 200 without being connected to a driving part such as a motor, unlike the first wheel member 120 of the first cleaning unit 100.

Accordingly, when the second cleaning unit 200 is moved together with the first cleaning unit 100 by magnetic force, the second wheel member 220 may be rotated to perform a function similar to that of a bearing.

Although each of the second wheel members 220 has a cylindrical shape in FIG. 3, the present disclosure is not limited thereto. For example, a member having a globular shape such as a ball bearing may be used as the second wheel member 220.

The cleaning modules 230 may be exposed to the bottom surface of the second frame 210 to clean one surface of a window, e.g., the outer surface on which the second cleaning unit 200 is disposed.

As shown in FIG. 3, each of the cleaning modules 230 may include a plurality of modules, for example, a cleaning pad 231, the second magnetic module 233, and a detergent injection port 232. Also, the cleaning modules 230 may include four disk bodies corresponding to those of the first magnetic modules 130 of the first cleaning unit 100.

Each of the four disk bodies may be rotated by a driving part (not shown) such as a motor (not shown). Also, each of the cleaning modules 230 may protrude a predetermined distance from a bottom surface of the second frame 210. Thus, the second cleaning unit 200 may clean the outer surface of the window with frictional force according to a rotation of the cleaning modules 230 in a state where the second cleaning unit 200 is attached to the window.

A pad 231 formed of fabric or rubber to easily remove foreign materials from the window with frictional force due to a rotation may be attached to the exposed surface of each of the cleaning modules 230. In this case, the pad 231 may be formed of a material having a microtriche structure or porous structure to improve cleaning performance of the window cleaning apparatus.

Also, the cleaning module 230 may include the detergent injection port 232. For example, the detergent injection port 232 may be connected to a detergent storage container (not shown) and a pump (not shown) which are disposed within the second cleaning unit 200 through a separate passage to receive a detergent. Thus, when a window is cleaned, the cleaning module 230 may inject the detergent onto the window through the detergent injection port 232 to perform the cleaning process.

The second magnetic module 233 may be disposed at the inside of the cleaning module 230, i.e., under the pad 231 to overlap the pad 231. The second magnetic module 233 has a shape corresponding to that of the first magnetic module 233 of the first cleaning unit 100. Also, the second magnetic module 233 may generate magnetic force to attach the first and second cleaning units 100 and 200 to both surfaces of the window.

The second magnetic module 233 may include a magnetic body or metal body such as a permanent magnet or electromagnet. Thus, the first and second cleaning units 100 and 200 respectively disposed on both surfaces of the window may attract each other with magnetic force. As a result, the first and second cleaning units 100 and 200 may be attached to the window, and be moved together.

For example, the cleaning module 230 may be disposed to correspond to the first magnetic module 130, and the second magnetic module 233 including a neodium magnet having a pole opposite to that of the first magnetic module 130 may be disposed at the inside of the cleaning module 230.

Accordingly, the first and second cleaning units 100 and 200 may be attached to both surfaces of the window by the magnetic force between the first magnetic module 130 and the second magnetic module 233 of the cleaning module 230, and also the first and second cleaning units 100 and 200 may be integrally moved.

Also, the magnetic force between the first and second magnetic modules 130 and 233 may be continually applied to the cleaning module 230 toward the window. Thus, when the cleaning module 230 is rotated, fractional force against the window may be increased to improve the cleaning performance.

Referring to FIG. 3, a plurality of auxiliary cleaning modules 240 may be disposed at the corners of the second cleaning unit 200. Since the cleaning module 230 is disposed inside the second frame 210, it may be difficult to clean edge portions of the window. Thus, the second cleaning unit 200 may include the auxiliary cleaning modules 240 to more easily clean the edge portion of the window.

Each of the auxiliary cleaning modules 240 may include a roller member (not shown) which is rotatably installed. Also, a brush may be disposed on an outer surface of the roller member. Thus, when the second cleaning unit 200 is moved along a window frame, the auxiliary cleaning modules 240 may be rotated by fractional force against the window frame to remove foreign materials on the window frame.

As described above, the auxiliary cleaning modules 240 may perform the same function as that of the buffer member 140 of the first cleaning unit 100. That is, the auxiliary cleaning modules 240 may minimize a shock when the window cleaning apparatus collides with a protrusion structure such as a window frame, and detect the shock using a sensor provided therein.

Referring to FIGS. 1 to 3, although the window cleaning apparatus cleans only one surface of the window, e.g., the outer surface of the window, this is merely an embodiment, and thus the present disclosure is not limited thereto.

For example, the first cleaning unit 100 may also include the cleaning module 230 of the second cleaning unit 200. Thus, the window cleaning apparatus may clean both surface of a window at the same time.

According to the embodiment, when a direction detecting sensor (for example, an acceleration sensor) senses a direction of the window cleaning apparatus described with reference to FIGS. 1 to 3, a movement of the window cleaning apparatus is controlled based on the sensed direction, and a direction offset of the direction sensor may be reset when the window cleaning apparatus collides with the frame of a window.

Figure 4:
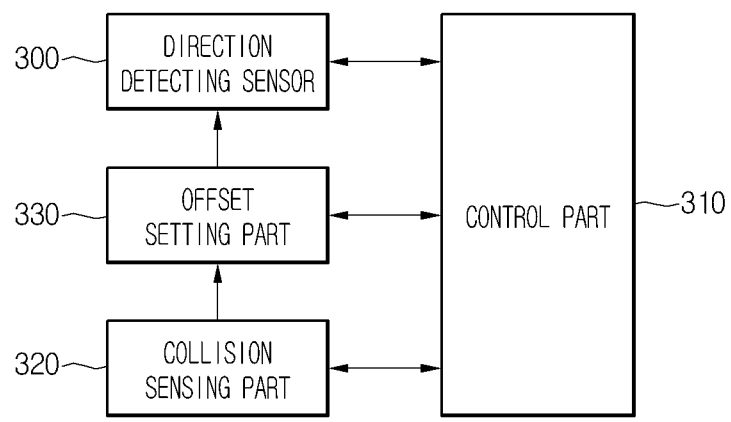
FIG. 4 is a block diagram illustrating a movement control device of a window cleaning apparatus according to an embodiment.

FIG. 4 is a block diagram illustrating a movement control device of a window cleaning apparatus according to an embodiment. The movement control device may include a direction detecting sensor 300, a control part 310, a collision sensing part 320, and an offset setting part 330.

Referring to FIG. 4, the direction detecting sensor 300 can detect a moving direction of a window cleaning apparatus.

The direction detecting sensor 300 senses a variation of an outer physical condition to convert the variation into an electrical signal, that is, senses physical values such as an inclination and acceleration of an object to convert the physical values into an electrical signal.

For example, the direction detecting sensor 300 may include an acceleration sensor that senses acceleration of an object to convert the acceleration into an electrical signal. The acceleration sensor may be a sensor using a piezo-resistor or capacitance.

In more detail, when the acceleration sensor uses capacitance, the acceleration sensor includes an inner mass therein. In this case, the position of the inner mass varies in an acceleration motion to thereby vary an overlap area between the inner mass and a sensing electrode. Accordingly, a variation of capacitance between electrodes is measured, thereby measuring an acceleration.

The direction detecting sensor 300 including the acceleration sensor can detect a moving direction of the window cleaning apparatus, based on preset reference axes (e.g., a horizontal x axis and a vertical y axis).

The direction detecting sensor 300 may be provided to at least one of the first and second cleaning units 100 and 200 as illustrated in FIGS. 1 to 3. For example, the direction detecting sensor 300 may be provided to the first cleaning unit 100 that is attached to the inner side of a window to move the window cleaning apparatus.

In this case, the direction detecting sensor 300 uses the acceleration sensor to detect a moving direction of the first cleaning unit 100.

Although the direction detecting sensor 300 includes the acceleration sensor to detect a moving direction of the window cleaning apparatus, the present disclosure is not limited thereto, and thus, the acceleration sensor may be replaced with any sensor for detecting a moving direction of the window cleaning apparatus.

The control part 310 may control a movement of the window cleaning apparatus, based on a moving direction of the window cleaning apparatus detected by the direction detecting sensor 300.

For example, the control part 310 may be provided to the first cleaning unit 100 to control a rotation of the first wheel members 120 as illustrated in FIG. 2. To this end, the control part 310 may include the driving part for driving motors connected to the first wheel members 120.

In more detail, the control part 310 may adjust voltage (or current) supplied to the motors connected to the first wheel members 120 to control a movement of the first cleaning unit 100 in a desired direction at desired speed, and a moving direction of the first cleaning unit 100 may be controlled based on a direction of the window cleaning apparatus sensed by the direction detecting sensor 300.

That is, the control part 310 may compare a desired moving direction with a current direction of the window cleaning apparatus sensed by the direction detecting sensor 300, to change a moving direction of the first cleaning unit 100 such that the current direction approaches the desired moving direction. To this end, the control part 310 may periodically check the direction sensed by the direction detecting sensor 300.

To this end, the control part 310 may include a circuit part (not shown) that may be provided in the form of a printed circuit board (PCB).

The collision sensing part 320 may sense a collision of the window cleaning apparatus. To this end, the collision sensing part 320 may include shock sensors (not shown) to sense a shock to the window cleaning apparatus.

For example, the collision sensing part 320 may be provided to the first cleaning unit 100 to sense a collision of the first cleaning unit 100 with the frame of a window.

To this end, the collision sensing part 320 may include the buffer members 140 to 143 disposed at the corners of the first cleaning unit 100 as illustrated in FIG. 2. The buffer members 140 to 143 may use the shock sensors to sense a shock due to the collision with the frame.

The offset setting part 330 sets a direction offset of the direction detecting sensor 300. According to an embodiment, a direction offset of the direction detecting sensor 300 may be reset just when the window cleaning apparatus collides with the frame of a window.

Figure 5:
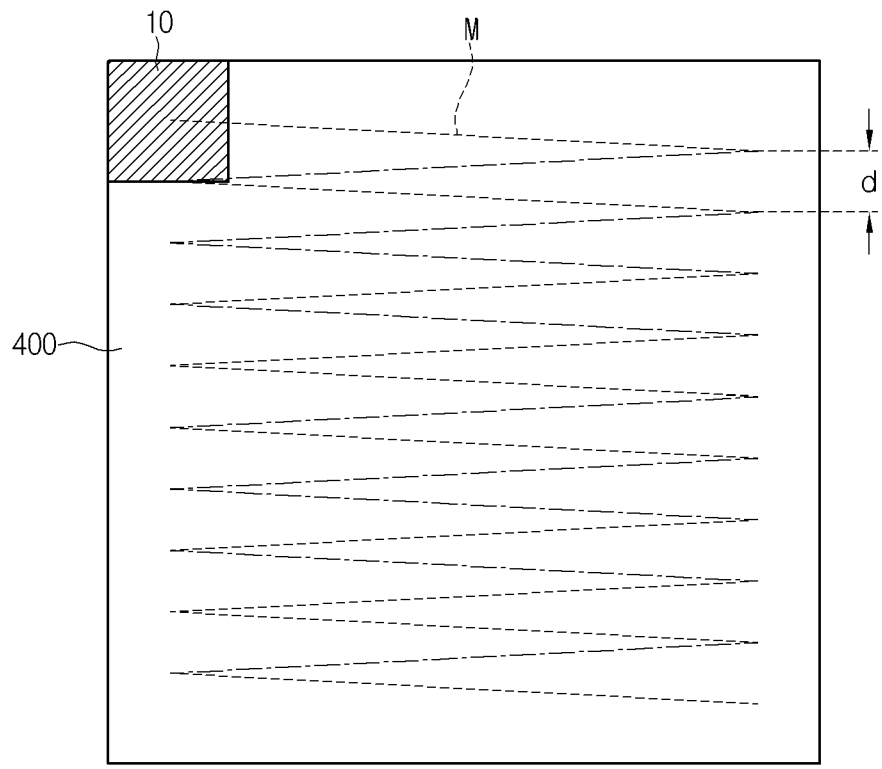
FIG. 5 is a schematic view illustrating a moving pattern of a window cleaning apparatus according to an embodiment.

FIG. 5 is a schematic view illustrating a moving pattern of a window cleaning apparatus according to an embodiment. Referring to FIG. 5, during a window cleaning operation, a window cleaning apparatus 10 may move along a moving path M, which includes right downward sections extending downward from the left end of a window 400 to the right end thereof, and left downward sections extending downward from the right end of the window 400 to the left end thereof.

The movement of the window cleaning apparatus 10 may be controlled by the control part 310. Based on a direction of the window cleaning apparatus 10 detected by the direction detecting sensor 300, the control part 310 may control the window cleaning apparatus 10 along the moving path M.

However, unless a direction offset of the direction detecting sensor 300 is accurately set, that is, unless reference axes set in the direction detecting sensor 300 coincide with real horizontal/vertical directions, a direction of the window cleaning apparatus 10 detected by the direction detecting sensor 300 may not coincide with a real direction.

In this case, a moving direction of the window cleaning apparatus 10 controlled by the control part 310 may not coincide with the moving path M that is preset. Accordingly, cleaning performance of the window cleaning apparatus 10 may be degraded, or the window cleaning apparatus 10 may operate improperly.

Inaccurate setting of a direction offset of the direction detecting sensor 300 will now be described in more detail with reference to FIG. 6. A horizontal reference axis x' and a vertical reference axis y' set in the direction detecting sensor 300 may not coincide with a real horizontal axis x and a real vertical axis y, which may be caused by a model tolerance of the direction detecting sensor 300, a mechanical assembling tolerance thereof, or an internal and external temperature variation thereof.

Figure 6:
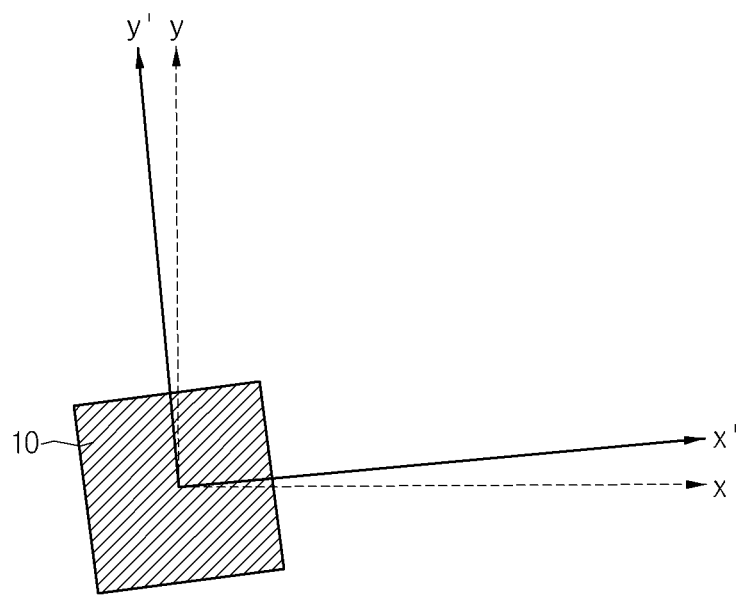
FIG. 6 is a schematic view illustrating a method of setting a direction offset of a direction detecting sensor of a window cleaning apparatus according to an embodiment.

Referring to FIG. 6, when a direction offset of the direction detecting sensor 300 is improperly set, although the control part 310 controls the window cleaning apparatus 10 to move, e.g., in a right horizontal direction (along the real horizontal axis x), the window cleaning apparatus 10 practically moves along the horizontal reference axis x' that is slightly higher than the right horizontal direction.

To address this error, it may be necessary to accurately set a direction offset of the direction detecting sensor 300 (that is, to match horizontal and vertical reference axes x' and y' with the real horizontal and vertical axes x and y).

The offset setting part 330 provided to the window cleaning apparatus 10 resets a direction offset of the direction detecting sensor 300 at a certain time point, thereby preventing a moving path error of the window cleaning apparatus 10 as described above.

In more detail, when the window cleaning apparatus 10 collides with a window frame, the offset setting part 330 may receive a signal from the collision sensing part 320 to reset a direction offset of the direction detecting sensor 300.

Hereinafter, a method of controlling a movement of the window cleaning apparatus 10 will now be described with reference to FIGS. 7 to 13.

The first cleaning unit 100 attached to the inner surface of the window 400 is moved using the control method, and the second cleaning unit 200 is moved by magnetic force according to the movement of the first cleaning unit 100.

However, the present disclosure is not limited thereto, and thus, the second cleaning unit 200 attached to the outer surface of the window 400 may be moved using the control method, and the first cleaning unit 100 may be moved by magnetic force according to the movement of the second cleaning unit 200. Furthermore, the first and second cleaning units 100 and 200 may be moved using the control method.

Figure 7:
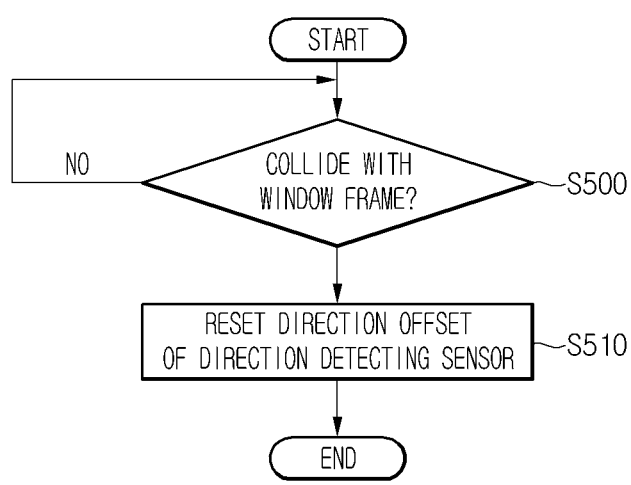
FIG. 7 is a flowchart illustrating a method of controlling a movement of a window cleaning apparatus according to an embodiment.

FIG. 7 is a flowchart illustrating a method of controlling a movement of a window cleaning apparatus according to an embodiment. The method of FIG. 7 is associated with the block diagram of FIG. 4 illustrating a movement control device of a window cleaning apparatus according to an embodiment.

Referring to FIG. 7, the collision sensing part 320 senses whether the window cleaning apparatus collides with a window frame, in operation S500.

The collision sensing part 320 may sense the first cleaning unit 100 collides with the window frame, by using the buffer members 140 to 143 as illustrated in FIG. 2.

For example, when a shock to the buffer members 140 and 141 disposed at a side of the first cleaning unit 100 is sensed, the collision sensing part 320 may recognize that the side of the first cleaning unit 100 where the buffer members 140 and 141 are disposed collides with the window frame.

When the window cleaning apparatus collides with the window frame, the offset setting part 330 resets a direction offset of the direction detecting sensor 300 in operation S510.

For example, when the side of the first cleaning unit 100 where the buffer members 140 and 141 are disposed collides with the window frame, a shock is sensed at the buffer members 140 and 141, and the collision sensing part 320 may output a signal for the offset setting part 330 to reset a direction offset of the direction detecting sensor 300.

Figure 8:
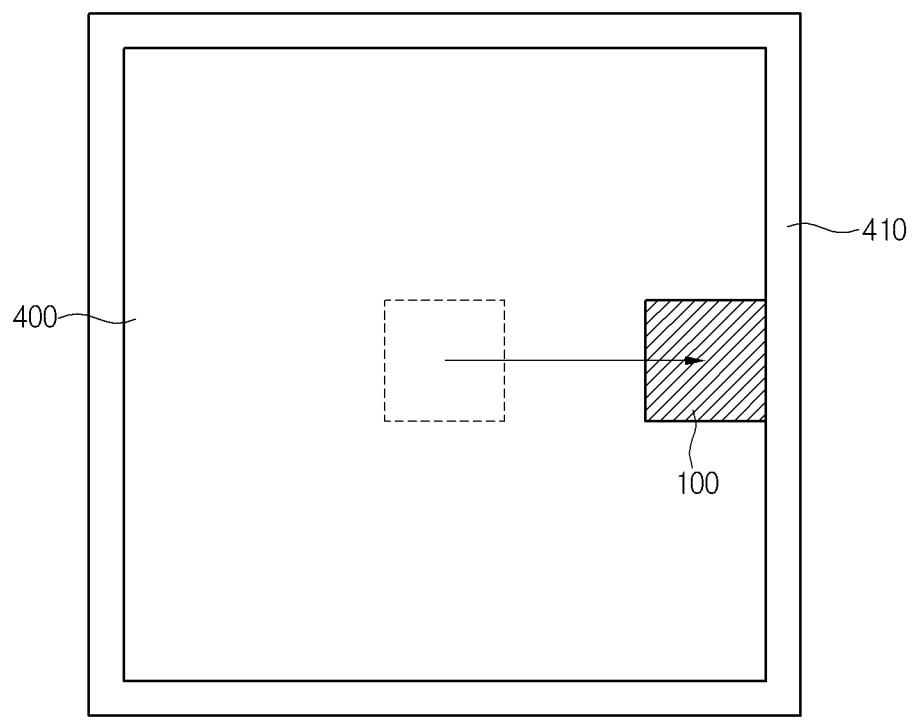

Referring to FIG. 8, just when the first cleaning unit 100 horizontally collides with a frame 410 of the window 400, particularly, with a vertical frame, the offset setting part 330 may reset a horizontal offset of the direction detecting sensor 300.

Figure 9:
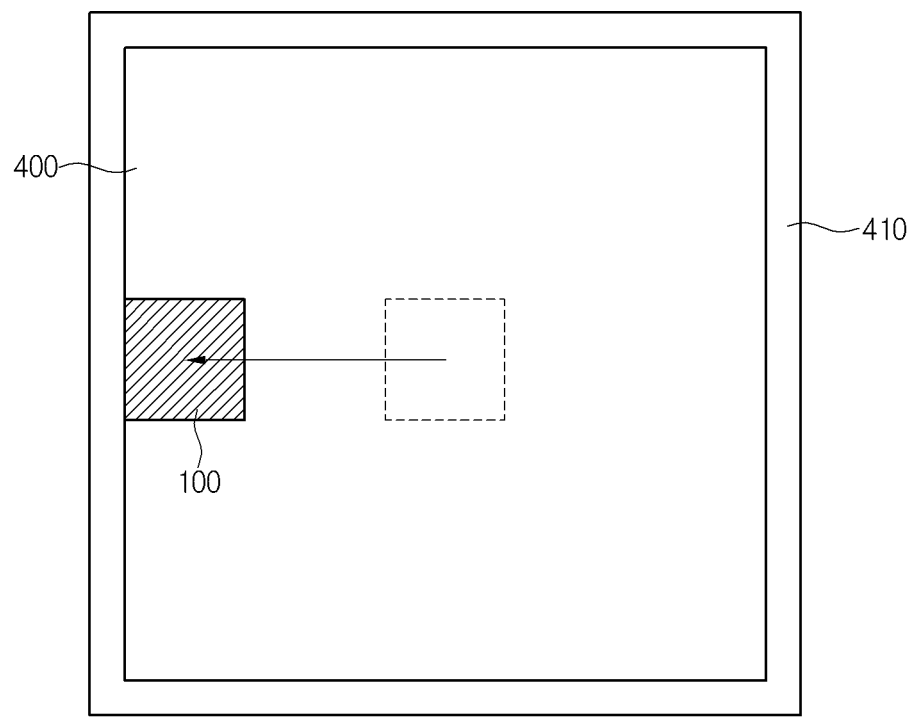

Referring to FIG. 9, just when the first cleaning unit 100 collides, in a horizontal left direction, with the frame 410 of the window 400, particularly, with a left vertical frame, the offset setting part 330 may reset a horizontal offset of the direction detecting sensor 300.

In addition, just when the first cleaning unit 100 collides with the right or left vertical frame, a vertical offset of the direction detecting sensor 300 may also be reset based on the resetting of the horizontal offset.

For example, the horizontal offset may be reset by adjusting the horizontal reference axis x' illustrated in FIG. 6 to coincide with the real horizontal axis x, and the vertical offset may be reset by adjusting the vertical reference axis y' to be perpendicular to the adjusted horizontal reference axis x'.

Hereinafter, a method of resetting a horizontal offset of the direction detecting sensor 300 will now be described with reference to FIGS. 10A and 10B according to an embodiment.

Referring to FIG. 10A, the first cleaning unit 100 may horizontally collide with a right vertical frame 410R of the window 400.

When a shock is sensed at one of the buffer members 140 and 141 disposed at a side of the first cleaning unit 100 as illustrated in FIG. 10A, the first cleaning unit 100 incompletely collides with the right vertical frame 410R of the window 140. Thus, the control part 310 may continually move the first cleaning unit 100 in the horizontal right direction.

That is, the control part 310 continually moves the first cleaning unit 100 until at least two buffer members disposed at the side of the first cleaning unit 100 collide all with the right vertical frame 410R.

Accordingly, when a shock is sensed at the buffer members 140 and 141 disposed at the side of the first cleaning unit 100 as illustrated in FIG. 10B, the collision sensing part 320 determines that the first cleaning unit 100 collides with the right vertical frame 410R, so as to output a collision sensing signal to the offset setting part 330.

Just when receiving the collision sensing signal from the collision sensing part 320, the offset setting part 330 may reset a horizontal offset of the direction detecting sensor 300, based on the current direction of the first cleaning unit 100.

That is, at the collision time point as illustrated in FIG. 10B, since the current direction of the first cleaning unit 100 is perpendicular to the right vertical frame 410R, the offset setting part 330 matches the horizontal reference axis x' of the direction detecting sensor 300 with the current direction of the first cleaning unit 100, thereby resetting the horizontal offset.

Accordingly, the horizontal reference axis x' of the direction detecting sensor 300 may be adjusted to coincide with the real horizontal axis x, thereby decreasing a horizontal moving error of the first cleaning unit 100.

When a shock is sensed at the buffer members 140 and 141 disposed at the side of the first cleaning unit 100 as illustrated in FIG. 10B, the control part 310 may stop the right movement of the first cleaning unit 100, and control the first cleaning unit 100 to move left along a preset path.

Figure 11:
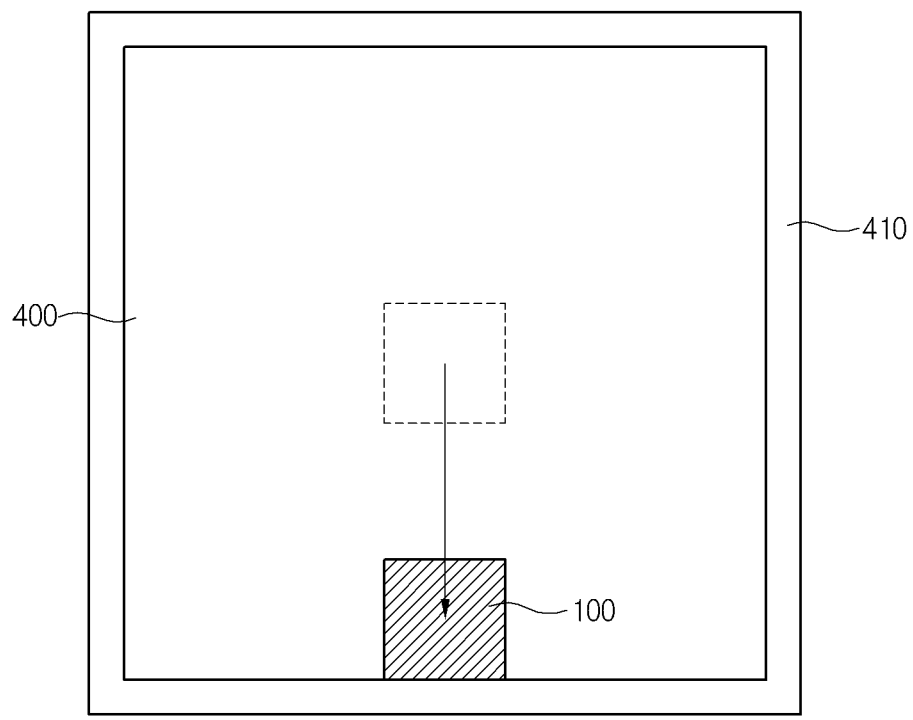

Referring to FIG. 11, just when the first cleaning unit 100 collides, in a vertical downward direction, with the frame 410 of the window 400, particularly, with a horizontal frame, the offset setting part 330 may reset a vertical offset of the direction detecting sensor 300.

Figure 12:
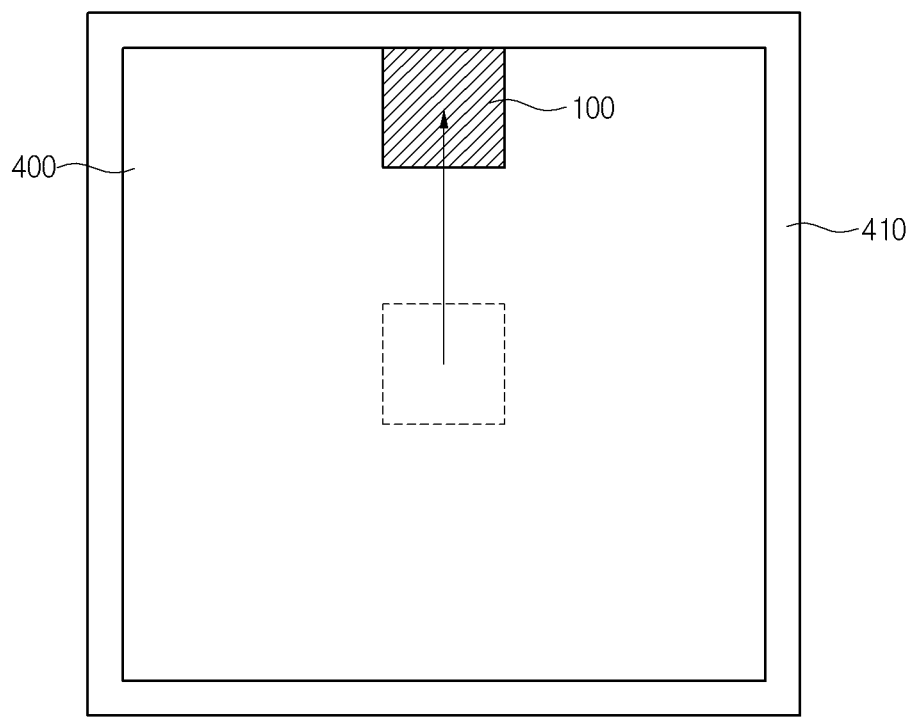

Referring to FIG. 12, just when the first cleaning unit 100 collides, in a vertical upward direction, with the frame 410 of the window 400, particularly, with the upper horizontal frame, the offset setting part 330 may reset a vertical offset of the direction detecting sensor 300.

In addition, just when the first cleaning unit 100 collides with the upper or lower horizontal frame, a horizontal offset of the direction detecting sensor 300 may also be reset based on the resetting of the vertical offset.

For example, the vertical offset may be reset by adjusting the vertical reference axis y' illustrated in FIG. 6 to coincide with the real vertical axis y, and the horizontal offset may be reset by adjusting the horizontal reference axis x' to be perpendicular to the adjusted vertical reference axis y'.

Hereinafter, a method of resetting a vertical offset of the direction detecting sensor 300 will now be described with reference to FIGS. 13A and 13B according to an embodiment.

Referring to FIG. 13A, the first cleaning unit 100 may collide, in a vertical downward direction, with a bottom horizontal frame 410B of the window 400.

When a shock is sensed at one of the buffer members 140 and 141 disposed at a side of the first cleaning unit 100 as illustrated in FIG. 13A, the first cleaning unit 100 incompletely collides with the bottom horizontal frame 410B of the window 140. Thus, the control part 310 may continually move the first cleaning unit 100 in the vertical downward direction.

Accordingly, when a shock is sensed at the buffer members 140 and 141 disposed at the side of the first cleaning unit 100 as illustrated in FIG. 13B, the collision sensing part 320 determines that the first cleaning unit 100 collides with the bottom horizontal frame 410B, so as to output a collision sensing signal to the offset setting part 330.

Just when receiving the collision sensing signal from the collision sensing part 320, the offset setting part 330 may reset a vertical offset of the direction detecting sensor 300, based on the current direction of the first cleaning unit 100.

That is, at the collision time point as illustrated in FIG. 13B, since the current direction of the first cleaning unit 100 is perpendicular to the bottom horizontal frame 410B, the offset setting part 330 matches the vertical reference axis y' of the direction detecting sensor 300 with the current direction of the first cleaning unit 100, thereby resetting the vertical offset.

Accordingly, the vertical reference axis y' of the direction detecting sensor 300 may be adjusted to coincide with the real vertical axis y, thereby decreasing a vertical moving error of the first cleaning unit 100.

When a shock is sensed at the buffer members 140 and 141 disposed at the side of the first cleaning unit 100 as illustrated in FIG. 13B, the control part 310 may stop the downward movement of the first cleaning unit 100, and control the first cleaning unit 100 to move upward, right, or left along a preset path.

A method of setting an offset of the direction detecting sensor 300 as described with reference to FIGS. 7 to 13 may be used just when a window cleaning apparatus collides with a window frame. Furthermore, the method may be used whenever a window cleaning apparatus collides with a window frame, or only when a window frame collision time point satisfies a preset condition.

For example, during a process that the window cleaning apparatus attached to a window detects an initial attached position, a process of cleaning the window, or a process of returning to the initial attached position after the cleaning, when the window cleaning apparatus moving along a preset moving path collides with a frame of the window, the above method of setting an offset of the direction detecting sensor 300 may be used.

Figure 14:
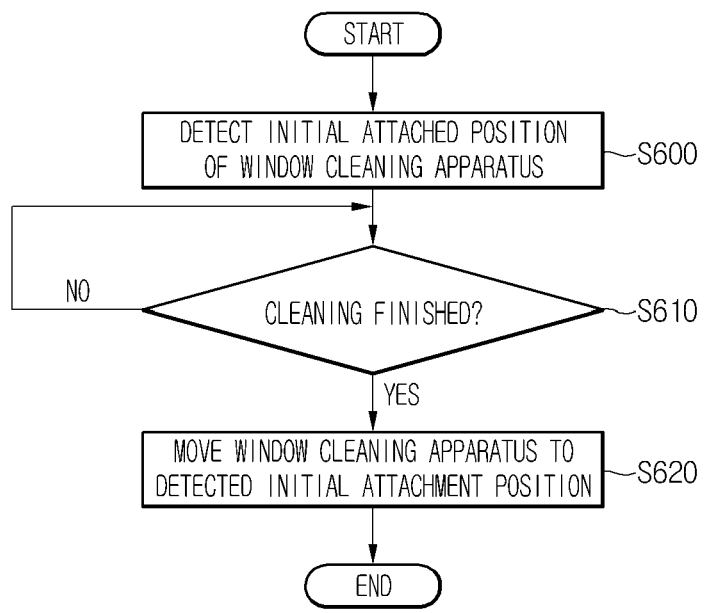
FIG. 14 is a flowchart illustrating a method of returning a window cleaning apparatus to an initial attached position after cleaning, according to an embodiment.

FIG. 14 is a flowchart illustrating a method of returning a window cleaning apparatus to an initial attached position after cleaning, according to an embodiment. The method may be performed by the control part 310 of the window cleaning apparatus.

Referring to FIG. 14, the control part 310 detects an initial attached position of the window cleaning apparatus in operation S600.

For example, when a user requests starting of a cleaning operation after the window cleaning apparatus is attached to a window, the control part 310 may determine whether the initial attached position of the window cleaning apparatus is at a left or right side of the window.

Thereafter, the window cleaning apparatus performs the cleaning operation while being moved along a preset moving path.

The control part 310 determines whether the cleaning operation is finished, in operation S610. When the cleaning operation is finished, the window cleaning apparatus is moved to a position adjacent to the detected attached position among the left and right end of the window, in operation S620.

For example, when it is determined that the initial attached position of the window cleaning apparatus is at the left side of the window in operation S600, the control part 310 may move the window cleaning apparatus up to the left end of the window after the cleaning operation is finished.

On the other hand, when it is determined that the initial attached position of the window cleaning apparatus is at the right side of the window, the control part 310 may move the window cleaning apparatus up to the right end of the window after the cleaning operation is finished.

That is, since a position at which the user attaches the window cleaning apparatus may be a position at which the user may easily remove the window cleaning apparatus from the window, the window cleaning apparatus may return to the position adjacent to the initial attached position, and be in a standby state, after the cleaning operation is finished. Thus, the user may easily remove the window cleaning apparatus from the window.

When the cleaning is not finished, the control part 310 may continually move the window cleaning apparatus along the moving path.

According to an embodiment, the window cleaning apparatus may be gradually moved from the upper end of the window to the lower end to perform the cleaning operation. In this case, when the window cleaning apparatus is moved down to the lower end of the window, the control part 310 may determine that the cleaning operation is finished.

A method of detecting an initial attached position of a window cleaning apparatus will now be described with reference to FIGS. 15 and 16 according to a first embodiment. When a user requests starting of a cleaning operation after attaching the window cleaning apparatus 10 to the window 400, the first cleaning unit 100 moves upward from the initial attached position.

Figure 15:
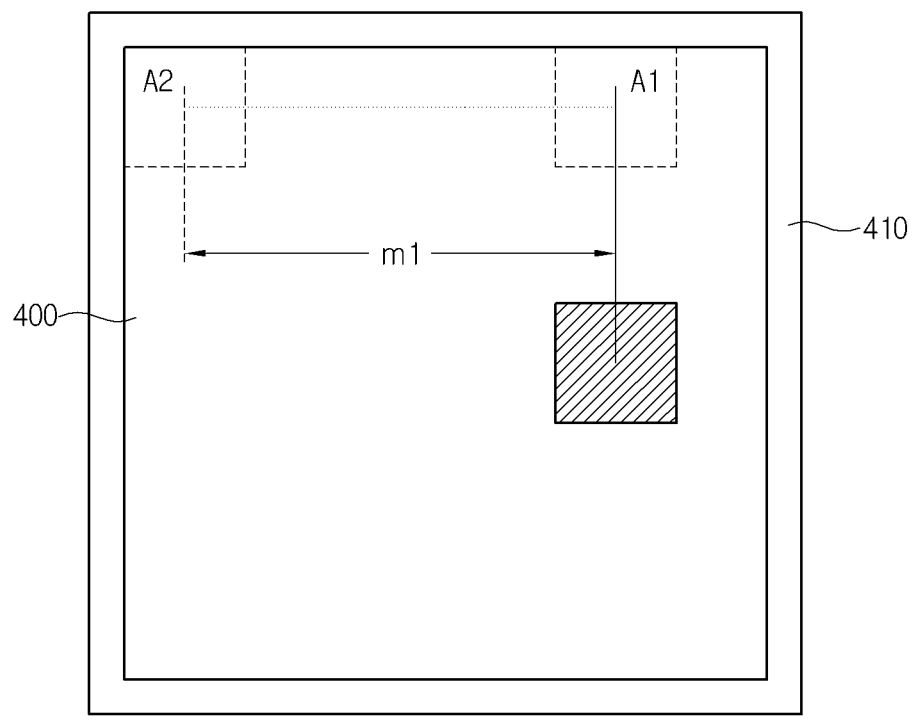
FIGS. 15 and 16 are schematic views illustrating a method of resetting a direction offset of a direction detecting sensor while detecting an initial attached position of a window cleaning apparatus, according to a first embodiment.

Referring to FIG. 15, the first cleaning unit 100 may move from the initial attached position to the upper end of the window 400. When the buffer members oriented in the moving direction of the first cleaning unit 100 collide with the upper horizontal frame of the frame 410, it may be determined that the first cleaning unit 100 arrives at the upper end of the window 400.

Then, the first cleaning unit 100 may turn left, and horizontally move to the left end of the window 400. When the buffer members oriented in the moving direction of the first cleaning unit 100 collide with the left vertical frame of the frame 410, it may be determined that the first cleaning unit 100 arrives at the left end of the window 400.

According to an embodiment, at time points A1 and A2 when the first cleaning unit 100 collides with the frame 410, a direction offset of the direction detecting sensor 300 may be set as described with reference to FIGS. 7 to 13.

For example, at the time point A1 when the first cleaning unit 100 collides with the upper frame, a vertical offset of the direction detecting sensor 300 may be reset as described with reference to FIGS. 11 to 13. Then, a horizontal offset of the direction detecting sensor 300 may be reset based on the reset vertical offset.

In addition, at the time point A2 when the first cleaning unit 100 collides with the left frame, a horizontal offset of the direction detecting sensor 300 may be reset as described with reference to FIGS. 8 to 10.

Referring to FIG. 15, a first moving distance m1 may be measured during the left horizontal movement of the first cleaning unit 100. For example, the first moving distance m1 may be measured based on the amount of rotation of the first wheel members 120 disposed on the first cleaning unit 100.

Figure 16:
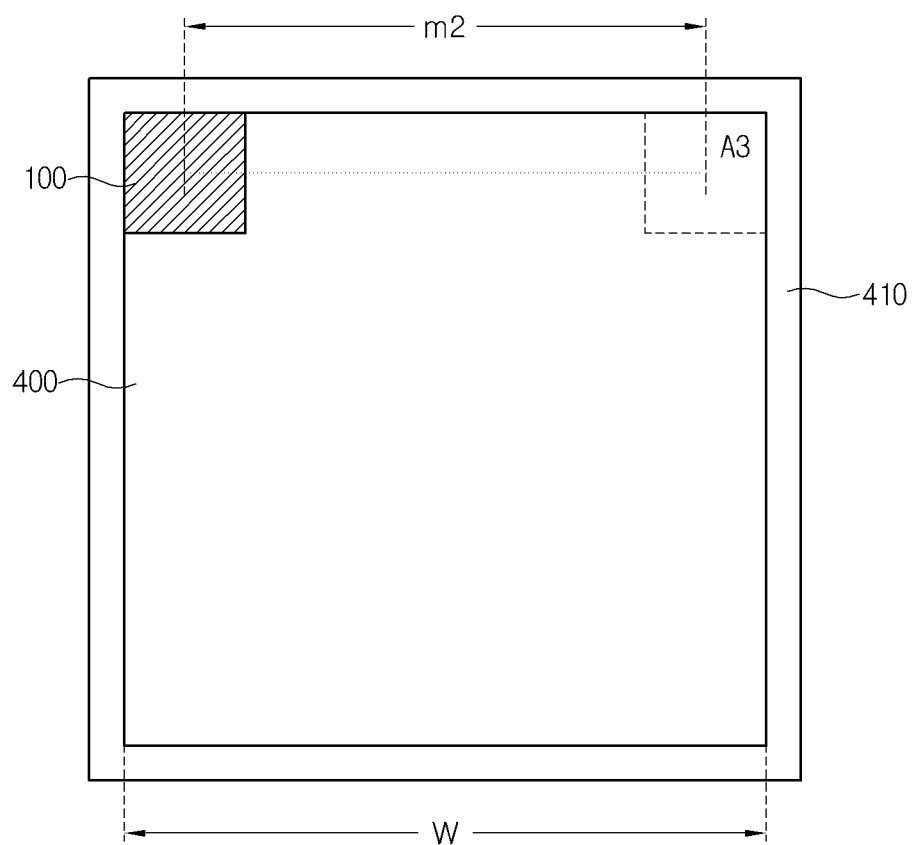

Referring to FIG. 16, the first cleaning unit 100 may be horizontally moved in a right direction from the top left end of the window 400 up to the right end of the window 400. When the buffer members oriented in the moving direction of the first cleaning unit 100 collide with the right frame of the frame 410, it may be determined that the first cleaning unit 100 arrives at the right end of the window 400.

At a time point A3 when the first cleaning unit 100 collides with the right frame, a horizontal offset of the direction detecting sensor 300 may be reset, and a vertical offset of the direction detecting sensor 300 may be reset based on the reset horizontal offset.

In addition, a second moving distance m2 may be measured while the first cleaning unit 100 is moved from the top left end to the top right end of the window 400. For example, the second moving distance m2 may be measured based on the amount of rotation of the first wheel members 120 disposed on the first cleaning unit 100.

According to an embodiment, after the first moving distance m1 and the second moving distance m2 are measured, the first and second moving distances m1 and m2 may be compared to each other to detect an initial attached position of the window cleaning apparatus.

For example, referring to FIGS. 15 and 16, since the first moving distance m1 is greater by about ½ than the second moving distance m2, it may be determined that the initial attached position of the window cleaning apparatus is at the right side of the window 400.

Thus, after the cleaning operation is finished, the window cleaning apparatus, i.e., the first cleaning unit 100 may be moved to and stay at the right end of the window 400. Thus, the user may easily remove the first and second cleaning units 100 and 200 from the window 400.

On the other hand, when the first moving distance m1 is less by about ½ than the second moving distance m2, it may be determined that the initial attached position of the window cleaning apparatus is at the left side of the window 400. Thus, after the cleaning operation is finished, the first cleaning unit 100 may be moved to and stay at the left end of the window 400.

Hereinafter, a method of detecting an initial attached position of a window cleaning apparatus will now be described with reference to FIGS. 17 to 24 according to a second embodiment.

Figure 17:
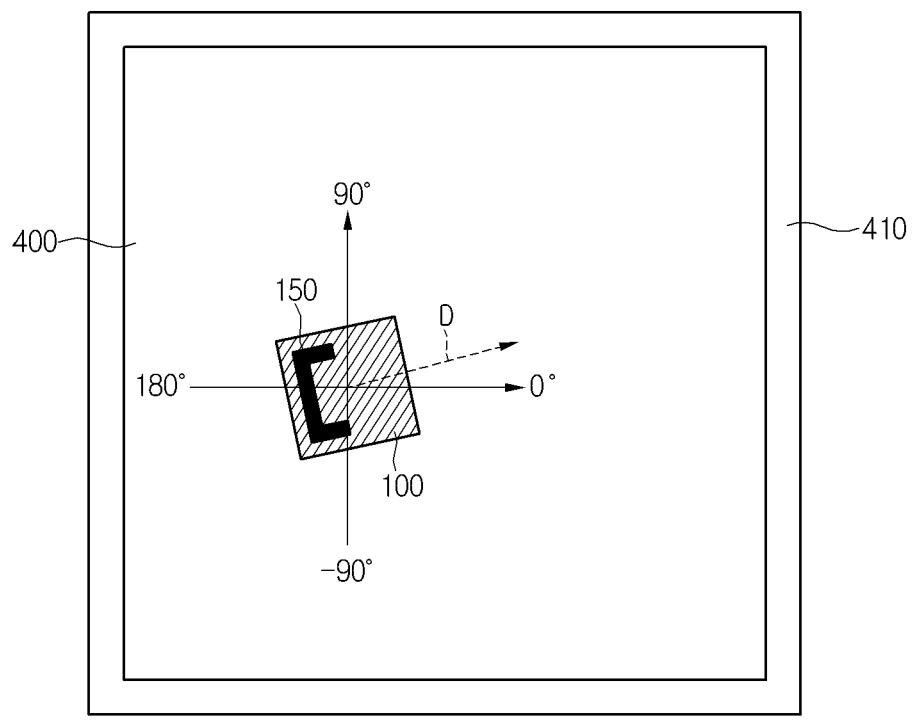
FIGS. 17 to 24 are schematic views illustrating a method of resetting a direction offset of a direction detecting sensor while detecting an initial attached position of a window cleaning apparatus, according to a second embodiment.

Referring to FIG. 17, when an initial attached direction D of a window cleaning apparatus is a right direction, that is, is adjacent to 0° from an axis of 90°/−90°, it may be determined that the window cleaning apparatus is attached to the left side of a window.

Figure 18:
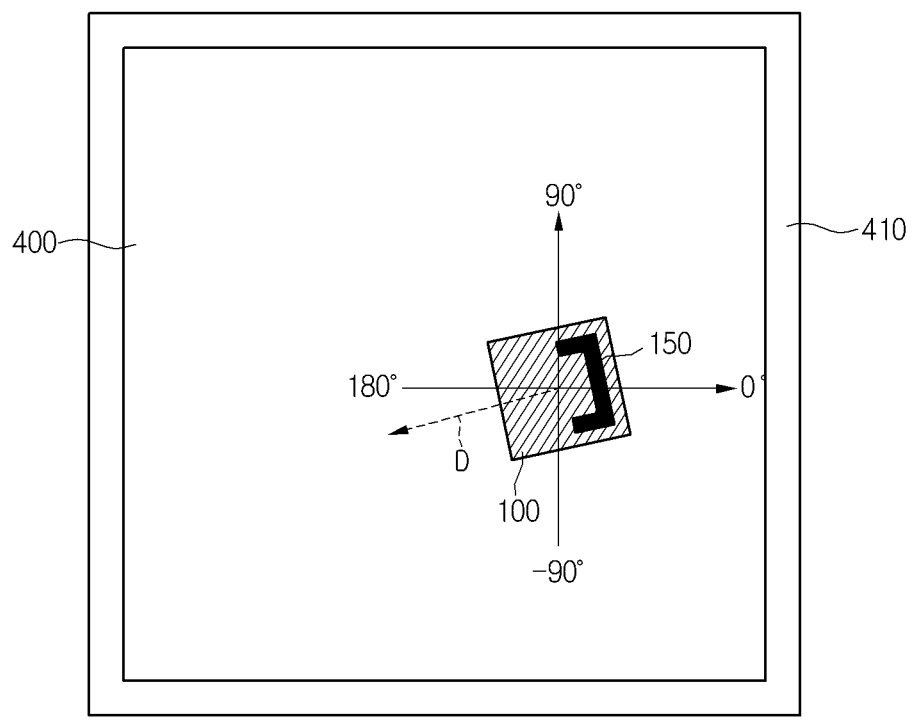

Referring to FIG. 18, when the initial attached direction D of the window cleaning apparatus is a left direction, that is, is adjacent to 180° from the axis of 90°/−90°, it may be determined that the window cleaning apparatus is attached to the right side of the window.

When a user initially attaches the window cleaning apparatus to the window 400, an attachment/detachment member 150 as a handle provided to the first cleaning unit 100 is typically oriented to the frame 410 of the window 400. Thus, when it is assumed that the orientation of the attachment/detachment member 150 is opposite to a moving direction of the first cleaning unit 100, the initial attached direction D of the window cleaning apparatus may be opposite to the attached position thereof.

For example, when a user attached the window cleaning apparatus to the left side of the window 400 by using the attachment/detachment member 150, the attachment/detachment member 150 may be oriented to the left side, and the window cleaning apparatus may be oriented to the right side.

In this case, since the orientation of the window cleaning apparatus is close to 0°, the control part 310 may determine that the window cleaning apparatus is initially attached to the left side of the window 400.

On the contrary, when an orientation of the attachment/detachment member 150 and a moving direction of the first cleaning unit 100 are the same, it may be determined that the initial attached direction D of the window cleaning apparatus is oriented to the side of an attached position thereof.

That is, when the initial attached direction D is close to 0°, it may be determined that the window cleaning apparatus is initially attached to the right side of a window. In addition, when the initial attached direction D is close to 180°, it may be determined that the window cleaning apparatus is initially attached to the left side of a window.

As such, after a horizontal initial attached position (that is, the left or right side) of the window cleaning apparatus is determined, the control part 310 moves the window cleaning apparatus to the left or right side determined as the horizontal initial attached position.

Figure 19:
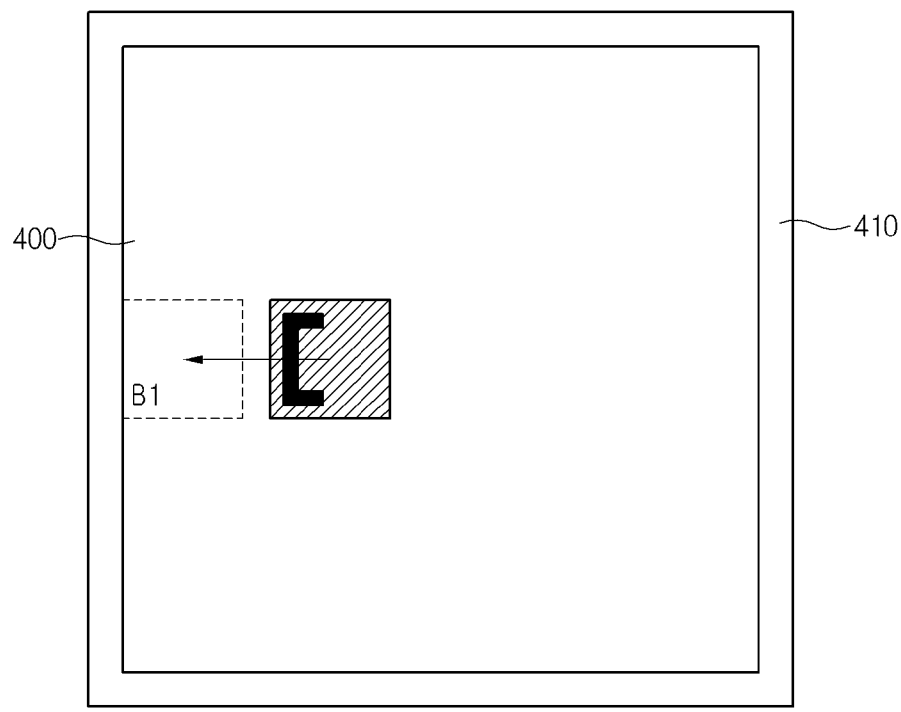

Referring to FIG. 19, when determining that the window cleaning apparatus is initially attached to the left side of the window 400, the control part 310 may move the first cleaning unit 100 to the left side.

The first cleaning unit 100 moved to the left side may collide with the left vertical frame of the frame 410. At a time point B1 when the first cleaning unit 100 collides with the left vertical frame of the frame 410, a horizontal offset of the direction detecting sensor 300 may be reset as described with reference to FIGS. 8 to 10.

Figure 20:
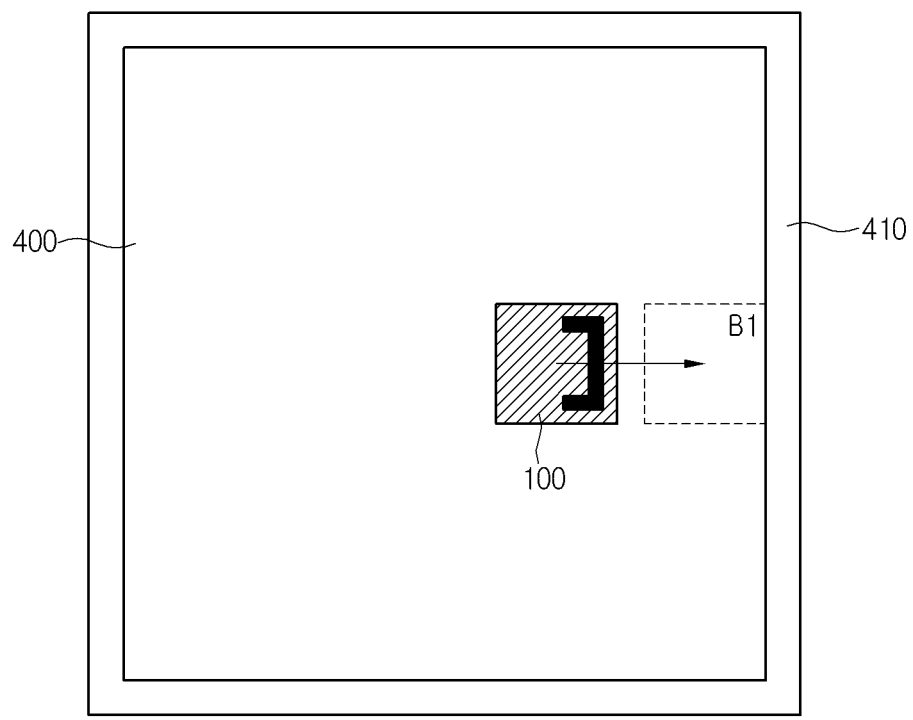

Referring to FIG. 20, when determining that the window cleaning apparatus is initially attached to the right side of the window 400, the control part 310 may move the first cleaning unit 100 to the right side.

The first cleaning unit 100 moved to the right side may collide with the right vertical frame of the frame 410. At a time point B1 when the first cleaning unit 100 collides with the right vertical frame of the frame 410, a horizontal offset of the direction detecting sensor 300 may be reset as described with reference to FIGS. 8 to 10.

At the time point B1 as illustrated in FIGS. 19 and 20, the offset setting part 330 may reset a vertical offset of the direction detecting sensor 300, based on the reset horizontal offset.

Figure 21:
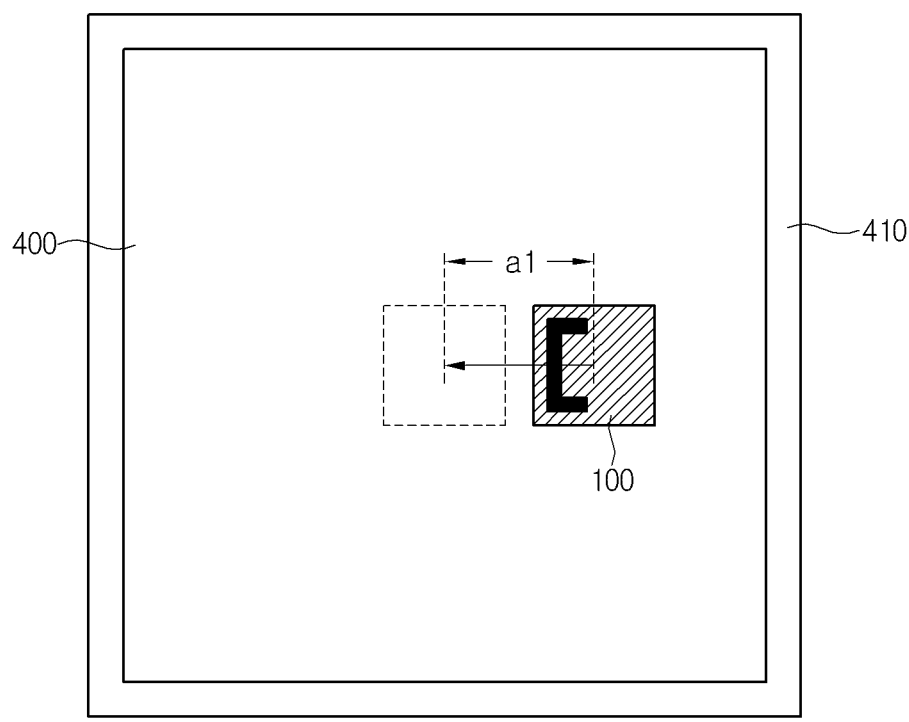

Referring to FIG. 21, when the control part 310 determines that an initial attached position of the window cleaning apparatus is at the left side of the window 400, and move the first cleaning unit 100 to the left side, the first cleaning unit 100 may not collide with the left frame of the frame 410 within a preset distance a1.

This is because the control part 310, using the method described with reference to FIGS. 17 and 18, improperly determines the initial attached position. Thus, when the first cleaning unit 100 may not collide with the left frame of the frame 410 within the preset distance a1, the control part 310 may determine again that the initial attached position of the window cleaning apparatus is at the right side of the window 400.

For example, when it is assumed that the window cleaning apparatus is initially attached within about 50 cm from the right or left frame of the window 400 according to a user's arm length, unless the first cleaning unit 100 collides the frame 410 within about 50 cm from the right or left frame while moving to a primarily determined side, the control part 310 may determine a horizontal initial attached position of the window cleaning apparatus is opposite to the primarily determined side.

As illustrated in FIG. 21, unless the first cleaning unit 100 collides with the frame 410 until moving left over the preset distance a1, the control part 310 may change the moving direction of the first cleaning unit 100 to the right side.

In this case, the horizontal initial attached position of the window cleaning apparatus may be changed from the left side that is primarily determined, to the right side.

Figure 22:
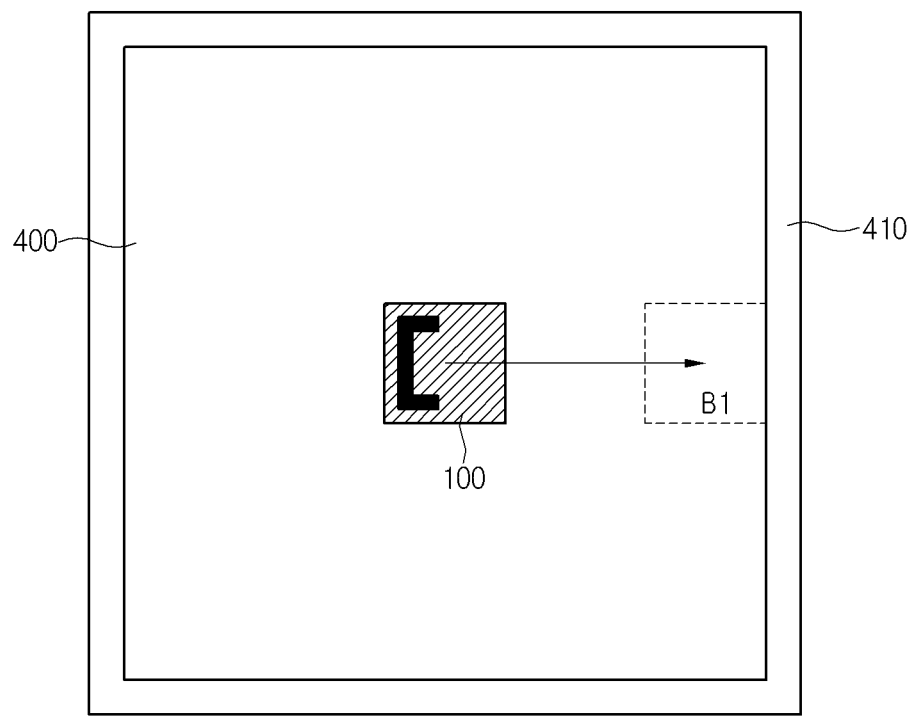

Then, referring to FIG. 22, the first cleaning unit 100 moved to the changed right side may collide with the right vertical frame of the frame 410. At the time point B1 when the first cleaning unit 100 collides with the right vertical frame of the frame 410, a horizontal offset of the direction detecting sensor 300 may be reset as described with reference to FIGS. 8 to 10.

At the time point B1 as illustrated in FIG. 22, the offset setting part 330 may reset a vertical offset of the direction detecting sensor 300, based on the reset horizontal offset.

After that, the first cleaning unit 100 is moved to the right or left side according to the initial attached position determined (or re-determined) as described with reference to FIGS. 17 to 22, and collides with the vertical frame of the frame 410. Then, the moving direction of the first cleaning unit 100 is changed to the opposite direction thereto, and the first cleaning unit 100 may be moved over a preset distance a2.

Figure 23:
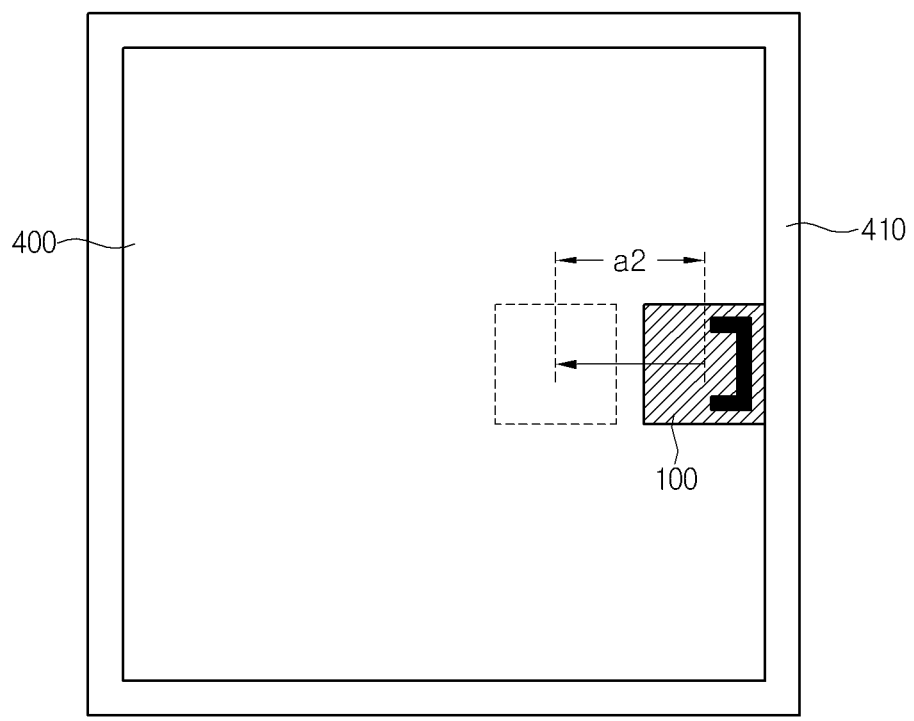

For example, as illustrated in FIG. 23, the first cleaning unit 100 may collide, in the right horizontal direction, with the right vertical frame of the frame 410, and then, move in the left horizontal direction over the preset distance a2 that ranges from about 10 to 15 cm.

Figure 24:
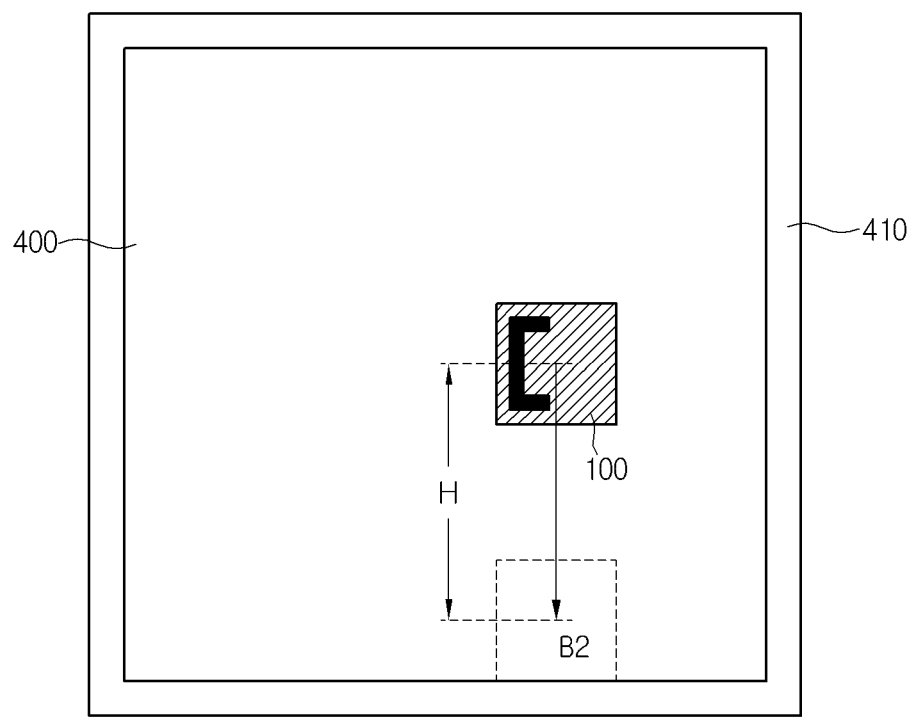

After that, referring to FIG. 24, the first cleaning unit 100 may move to the bottom frame of the frame 410 in the vertical downward direction.

At this point, a vertical moving distance H may be measured, e.g., based on the amount of rotation of the first wheel members 120 provided to the first cleaning unit 100.

The measured vertical moving distance H may be used to detect a vertical initial attached position of the window cleaning apparatus. After a cleaning operation, the first cleaning unit 100 is moved upward over the vertical moving distance H corresponding to the vertical initial attached position, and is in a standby state, so that the window cleaning apparatus can be easily removed.

At a time point B2 when the first cleaning unit 100 moves downward and collides with the bottom frame of the frame 410, a vertical offset of the direction detecting sensor 300 may be reset as described with reference to FIGS. 11 to 13.

Hereinafter, a method of resetting a direction offset of the direction detecting sensor 300 during a cleaning operation of the window cleaning apparatus will now be described with reference to FIG. 25 according to an embodiment.

Figure 25:
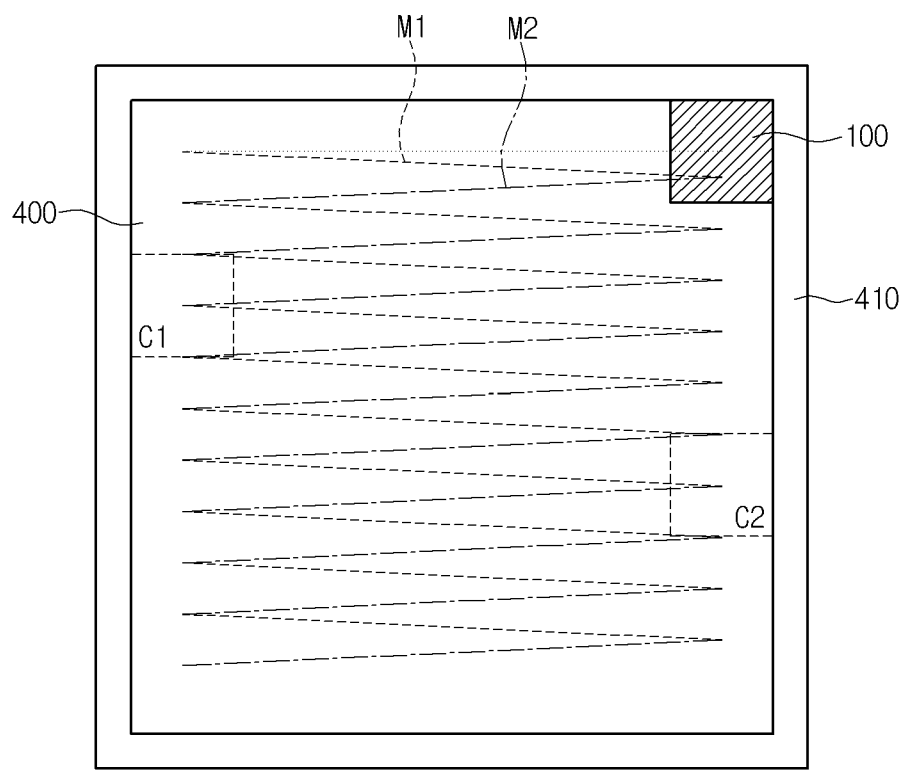
FIG. 25 is a schematic view illustrating a method of resetting a direction offset of a direction detecting sensor during a cleaning operation of a window cleaning apparatus, according to a second embodiment.

Referring to FIG. 25, after an initial attached position is detected as described above, the first cleaning unit 100 may move to the top right end (or the top left end) of the window 400, and may perform a cleaning operation along a preset moving path from the top right end.

For example, the first cleaning unit 100 may move to the top left end of the window 400, then moves downward to the right end of the window 400, and then, move downward to the left end of the window 400.

That is, the first cleaning unit 100 may move repeatedly and alternately along a right downward section M1, which extends in the right downward direction, and a left downward section M2, which extends in the left downward direction.

At a time point C1 when the first cleaning unit 100 moving in the left downward direction collides with the left vertical frame of the frame 410, a horizontal offset of the direction detecting sensor 300 may be reset as described with reference to FIGS. 8 to 10.

At a time point C2 when the first cleaning unit 100 moving in the right downward direction collides with the right vertical frame of the frame 410, the horizontal offset of the direction detecting sensor 300 may be reset.

A horizontal offset of the direction detecting sensor 300 may be reset whenever the first cleaning unit 100 moving along the moving path of FIG. 25 collides with the frame 410, or be reset according to a preset period T.

For example, when the preset period T is set to 100 seconds, the offset setting part 330 counts time from a time point when a direction offset of the direction detecting sensor 300 is reset. When the counted time reaches 100 seconds, a horizontal offset of the direction detecting sensor 300 may be reset at a time point when the first cleaning unit 100 collides with a window frame first after 100 seconds.

The moving path of FIG. 25 may be determined based on the width of the window 400.

To this end, the control part 310 measures the width of the window 400 over which the window cleaning apparatus moves left and right from an attached position thereof to clean the window 400, and a moving path of the window cleaning apparatus may be varied according to the measured width.

When the first cleaning unit 100 moving in the left and right downward directions along the moving path arrives at the bottom of the window 400, the cleaning operation may be ended.

For example, when a moving direction of the first cleaning unit 100 is oriented to the right downward side, the buffer members disposed at the right downward side may collide with the bottom frame of the frame 410. At this point, it may be determined that the first cleaning unit 100 arrives at the bottom of the window 400.

Then, the end of cleaning is recognized, and the first cleaning unit 100 may move to the right end of the window 400 in the horizontal right direction along the bottom frame of the frame 410. At this point, the injection of a detergent from the second cleaning unit 200 may be ended.

After that, the first cleaning unit 100 may move to the left end of the window 400 in the left horizontal direction along the bottom frame of the frame 410.

After the injection of the detergent from the second cleaning unit 200 is ended, the first cleaning unit 100 may horizontally move left and right to completely remove a detergent residue formed during a cleaning operation, from the bottom of the window 400.

When the cleaning operation is ended, the window cleaning apparatus 10, particularly, the first cleaning unit 100 may approach a position where a user can conveniently remove the first cleaning unit 100, e.g., approach an initial attached position.

Figure 26:
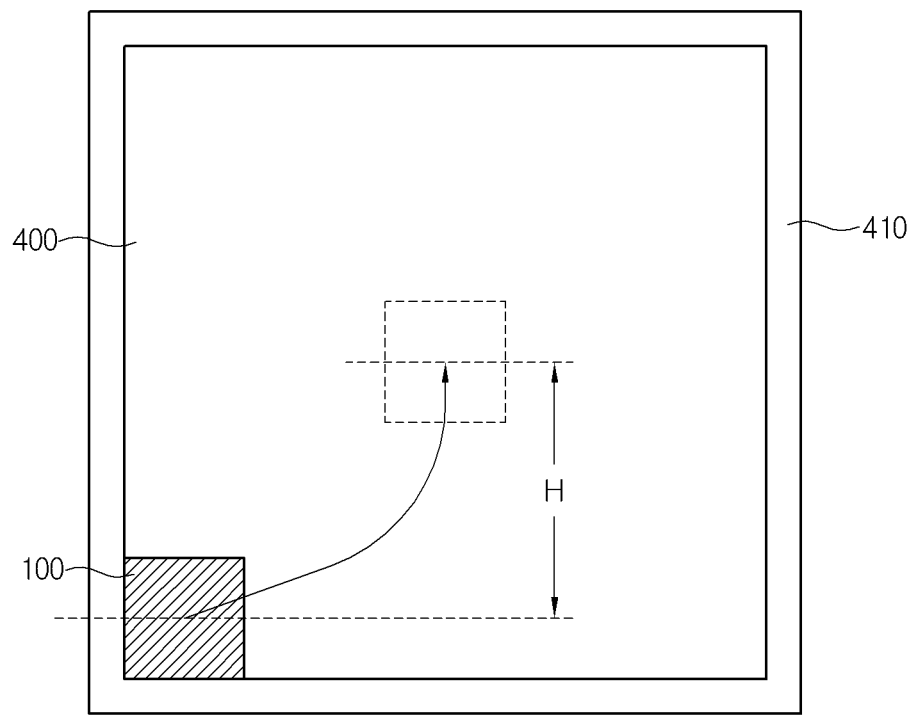
FIGS. 26 to 28 are schematic views illustrating a returning path of a window cleaning apparatus after cleaning, according to an embodiment.
Figure 27:
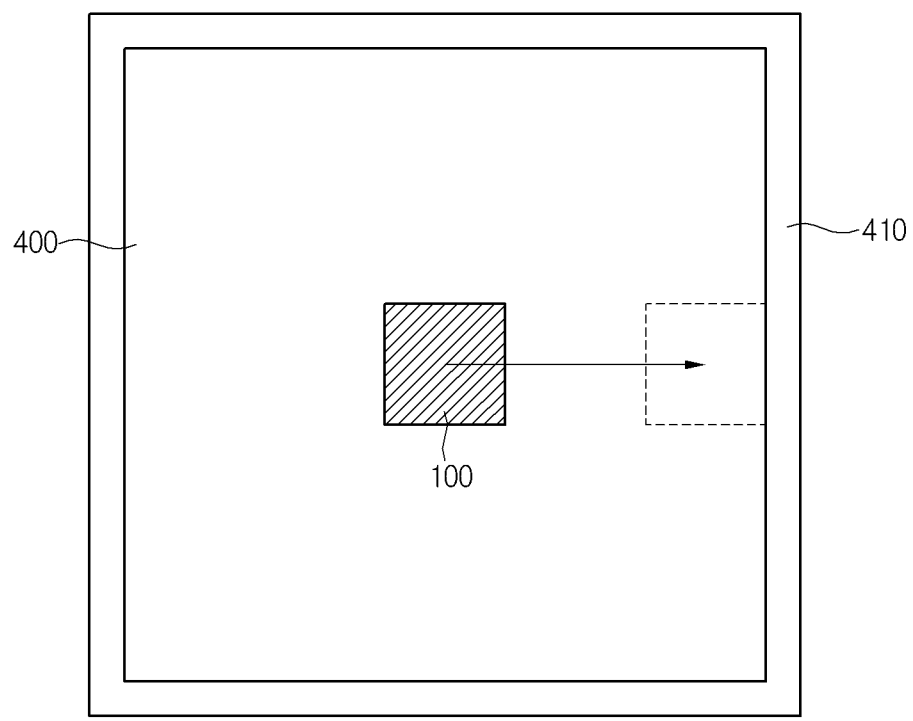
Figure 28:
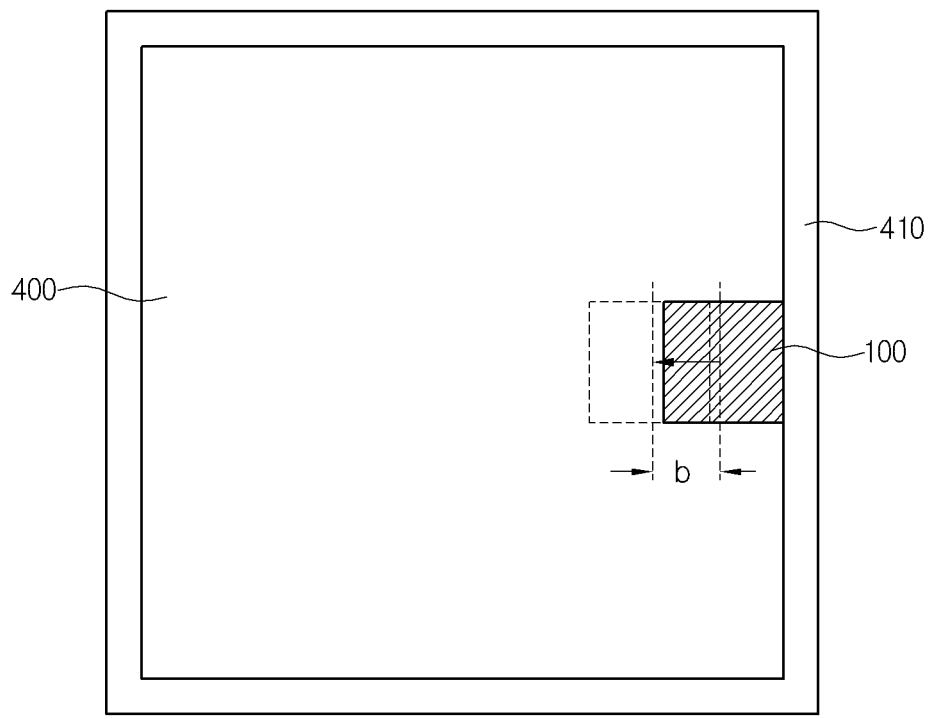

FIGS. 26 to 28 are schematic views illustrating a returning path of a window cleaning apparatus after cleaning, according to an embodiment.

Referring to FIG. 26, the first cleaning unit 100 is moved up to the left end of the window 400 after a cleaning operation, and then, the first cleaning unit 100 may be moved upward over a certain distance H.

For example, after the cleaning operation, the first cleaning unit 100 is moved in a right upward direction along a path similar to a parabola to ascend over the certain distance H.

When the first cleaning unit 100 is moved up to the right end of the window 400 to finish the cleaning operation, the first cleaning unit 100 may be moved in a left upward direction along a path similar to a parabola to ascend over the certain distance H.

The distance H over which the first cleaning unit 100 moves upward after the cleaning operation may correspond to a vertical position where a user initially attaches the window cleaning apparatus. For example, the distance H may correspond to the vertical moving distance H measured using the method described with reference to FIG. 24.

That is, after the cleaning operation, the first cleaning unit 100 ascends over the vertical moving distance H corresponding to the vertical initial attached position detected when the first cleaning unit 100 is attached, and stays, so that the user can easily remove the window cleaning apparatus from the window 400. { }

Thereafter, the first cleaning unit 100 may be moved toward an end adjacent to the horizontal initial attached position detected when the first cleaning unit 100 is attached, among the left and right ends of the window 400.

Referring to FIG. 27, when the initial attached position of the window cleaning apparatus is at the right side of the window 400, the first cleaning unit 100 may be horizontally moved up to the right end of the window 400 in the right direction.

Referring to FIG. 28, after the first cleaning unit 100 is moved up to the right end of the window 400, the first cleaning unit 100 may be moved in an opposite direction, i.e., the left direction by a certain distance b, and be stopped.

After the cleaning operation is finished, since the first cleaning unit 100 is stopped at a position spaced the certain distance b from the right end of the window 400, the user may easily remove the window cleaning apparatus from the window 400. This is because it may be difficult to remove the window cleaning apparatus when the window cleaning apparatus contacts the frame 410.

On the contrary, when the initial attached position of the window cleaning apparatus is at the left side of the window 400, the first cleaning unit 100 may be horizontally moved up to the left end of the window 400 in the left direction, then be moved in the right direction by the distance b, and then be stopped.

Although the method of controlling the movement of the window cleaning apparatus including the first and second cleaning units 100 and 200 respectively attached on the inner and outer surfaces of the window by the magnetic force is described as an example, the present disclosure is not limited thereto. For example, the method may be applied to a window cleaning apparatus which is attached to one surface of the inner and outer surfaces of the window 400 or a window cleaning apparatus attached to the window 400 through vacuum absorption except for the magnetic force.

Also, the method for controlling the window cleaning apparatus according to the embodiments may be programmed to be executed in a computer and stored in a computer readable recording medium. Examples of the computer readable recording medium include read-only memory (ROM), random-access memory (RAM), CD-ROMs, magnetic tapes, floppy disks, optical data storage devices, and carrier waves (such as data transmission through the Internet).

The computer readable recording medium may also be distributed over network coupled computer systems so that the computer readable code is stored and executed in a distributed fashion. Also, functional programs, codes, and code segments for realizing the control method can be easily construed by programmers skilled in the art to which the invention pertains.

According to one embodiment, a direction offset of the direction detecting sensor provided to the window cleaning apparatus is reset at a certain time point, whereby the window cleaning apparatus can move along a preset moving path without an error, thus improving cleaning performance of the window cleaning apparatus.

According to another embodiment, a moving path of the window cleaning apparatus is determined based on the width of a window, thereby efficiently cleaning windows various widths.

According to another embodiment, the window cleaning apparatus approaches an initial attached position after cleaning, so that a user can easily remove the window cleaning apparatus from a window.

Specifically, when a window cleaning apparatus includes two cleaning units attached respectively to inner and outer surfaces of a window with magnetic force, the cleaning units can be easily separated from each other, thereby improving the safety of the window cleaning apparatus.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A window cleaning apparatus comprising first and second cleaning units which are respectively attached on both surfaces of a window using a magnetic force to move together with each other, the window cleaning apparatus comprising:
a direction detecting sensor provided to at least one of the first and second cleaning units to detect a moving direction of the window cleaning apparatus;
a control part controlling a movement of the window cleaning apparatus, based on the moving direction detected by the direction detecting sensor;
a collision sensing part sensing a shock to the window cleaning apparatus; and an offset setting part setting a direction offset of the direction detecting sensor when the window cleaning apparatus collides with a frame of the window.

2. The window cleaning apparatus according to claim 1, wherein the direction detecting sensor comprises an acceleration sensor provided to the first cleaning unit attached to an inner surface of the window.

3. The window cleaning apparatus according to claim 1, wherein the control part is provided to the first cleaning unit attached to an inner surface of the window to control a movement of the first cleaning unit, and the second cleaning unit attached to an outer surface of the window is moved by the magnetic force according to the movement of the first cleaning unit.

4. The window cleaning apparatus according to claim 1, wherein the collision sensing part comprises buffer members that are disposed respectively at four corners of the first cleaning unit attached to an inner surface of the window.

5. The window cleaning apparatus according to claim 1, wherein the offset setting part resets a horizontal offset of the direction detecting sensor when the window cleaning apparatus collides with a vertical left or right frame of the window.

6. The window cleaning apparatus according to claim 5, wherein the offset setting part resets a vertical offset of the direction detecting sensor, based on the reset horizontal offset.

7. The window cleaning apparatus according to claim 5, wherein, when two or more buffer members disposed at a side of the window cleaning apparatus simultaneously collide with the vertical left or right frame, the window cleaning apparatus horizontally moves, and the horizontal offset is reset.

8. The window cleaning apparatus according to claim 1, wherein the offset setting part resets a vertical offset of the direction detecting sensor when the window cleaning apparatus collides with a horizontal upper or lower frame of the window.

9. The window cleaning apparatus according to claim 8, wherein, when two or more buffer members disposed at a side of the window cleaning apparatus simultaneously collide with the horizontal upper or lower frame, the window cleaning apparatus vertically moves, and the vertical offset is reset.

10. The window cleaning apparatus according to claim 1, wherein the control part moves the window cleaning apparatus to a left or right frame of the window to detect a horizontal initial attached position, and moves the window cleaning apparatus to an upper or lower frame of the window to detect a vertical initial attached position.

11. The window cleaning apparatus according to claim 10, wherein, when the window cleaning apparatus collides with the frame of the window during the detecting of an initial attached position, the offset setting part resets a direction offset of the direction detecting sensor.

12. The window cleaning apparatus according to claim 1, wherein the control part determines a moving path of the window cleaning apparatus, based on a width of the window, and controls the window cleaning apparatus to move along the determined moving path and perform a cleaning operation.

13. The window cleaning apparatus according to claim 12, wherein the offset setting part resets a horizontal offset of the direction detecting sensor when the window cleaning apparatus moving to perform the cleaning operation collides with a right or left frame of the window.

14. The window cleaning apparatus according to claim 13, wherein the horizontal offset of the direction detecting sensor is reset according to a preset period.

* * * * *